US012237563B1

(12) United States Patent
Macco

(10) Patent No.: US 12,237,563 B1
(45) Date of Patent: Feb. 25, 2025

(54) ANTI-THEFT RADIO ANTENNA DEVICE WITH ORIENTATION CONTROL

(71) Applicant: Ronin Factory LLC, Carlsbad, CA (US)

(72) Inventor: Scott Macco, Carlsbad, CA (US)

(73) Assignee: Ronin Factory LLC, Carlsbad, CA (US)

( * ) Notice: Subject to any disclaimer, the term of this patent is extended or adjusted under 35 U.S.C. 154(b) by 0 days.

(21) Appl. No.: 18/934,030

(22) Filed: Oct. 31, 2024

Related U.S. Application Data

(63) Continuation of application No. 18/472,158, filed on Sep. 21, 2023.

(51) Int. Cl.
*H01Q 1/32* (2006.01)
*H01Q 1/10* (2006.01)

(52) U.S. Cl.
CPC ............... *H01Q 1/106* (2013.01); *H01Q 1/32* (2013.01)

(58) Field of Classification Search
CPC ................................ H01Q 1/106; H01Q 1/32
See application file for complete search history.

(56) References Cited

U.S. PATENT DOCUMENTS 2,481,823 A 9/1949 Joseph
D243,154 S 1/1977 Dieme
D249,139 S 8/1978 Lin
D283,783 S 5/1986 Park
D309,736 S 8/1990 Charet et al.
D310,956 S 10/1990 Huska
D318,102 S 7/1991 Papai
D320,603 S 10/1991 Jones
D325,384 S 4/1992 Cooper
D325,583 S 4/1992 Matuszewski
D333,661 S 3/1993 Elliott et al.
5,524,284 A * 6/1996 Marcou .................. H01Q 1/242 343/702
5,616,043 A 4/1997 Liou
D382,565 S 8/1997 Martinson et al.
D387,064 S 12/1997 Heine
D387,774 S 12/1997 Mosser
5,835,064 A * 11/1998 Gomez .................. H01Q 1/242 343/702
D413,604 S 9/1999 Funke et al.
(Continued)

OTHER PUBLICATIONS

RedRock Billet Aluminum Bullet Style Antenna. (Year: 2003).*
(Continued)

*Primary Examiner* — Awat M Salih
(74) *Attorney, Agent, or Firm* — John M. Rogitz; John L. Rogitz

(57) ABSTRACT

An antenna adapter may be used for mounting an antenna to a vehicle or other object via the object's antenna mount, making antenna theft more difficult. The adapter is therefore configured to both receive the antenna and engage the antenna mount. The antenna adapter includes one or more elements that are configured to assist in removable engagement of the antenna adapter with the antenna, such as a groove and a set screw that screws through the antenna and into the groove of the adapter. The antenna adapter may also include another element that is configured to maintain the antenna at a particular radial orientation with respect to the antenna adapter when engaged therewith.

20 Claims, 26 Drawing Sheets

(56) References Cited

U.S. PATENT DOCUMENTS

| | | | | |
|---|---|---|---|---|
| 6,686,888 | B1 | 2/2004 | Wendt et al. | |
| D576,027 | S | 9/2008 | Lanz | |
| D649,140 | S | 11/2011 | Spatter et al. | |
| D689,044 | S | 9/2013 | Podduturi | |
| D726,631 | S | 4/2015 | Widgery | |
| D823,840 | S | 7/2018 | Gilbert | |
| D847,595 | S | 5/2019 | Hampton | |
| D951,924 | S * | 5/2022 | Baiz | D14/230 |
| 2009/0079640 | A1 | 3/2009 | Gray et al. | |
| 2009/0140940 | A1 | 6/2009 | Giesbrecht | |
| 2010/0220021 | A1 * | 9/2010 | Khreizat | H01Q 9/30 343/715 |
| 2014/0231612 | A1 * | 8/2014 | O'Neal | H01Q 1/1207 248/539 |
| 2017/0350671 | A1 | 12/2017 | Larue | |
| 2021/0203064 | A1 * | 7/2021 | Hoffman | H01Q 1/1207 |
| 2024/0106108 | A1 | 3/2024 | Arendt et al. | |

OTHER PUBLICATIONS

"Autoxbert 5.7 Inch Aluminium FM Bullet Aerial Antenna Radio", Dec. 16, 2022, Amazon, https://www.amazon.sg/Aluminium-Replacement-Amplifier-Wrangler-2007-2021/dp/BOBQBR67HC (Year: 2022).

"Bingfu Vehicle Bullet Antenna Mast" Jun. 24, 2020, Amazon, : https://www.amazon.sa/-/en/Bingfu-Replacement-Compatible-2007-2020-Gladiator/dp/B089H 1 SF87 (Year: 2020).

"Ronin Factory Bullet Antenna for Dodge RAM & Ford F150 F250 F350" Apr. 2, 2021, Ubuy, https://www.ubuy.qa/en/producU32GQ7WA (Year: 2021).

* cited by examiner

Section H-H
Scale 2:1

Detail M
Scale 6:1

Size D3X4
Normal Force Valve: 18N

| Size | Shell OD | Shell Length | Flange OD | Flange Thickness | Route | Nose Dia | Normal Force Value |
|---|---|---|---|---|---|---|---|
| D3X4 | 3.00 | 4.00 | 3.50 | 0.80 | 0.85 | 2.38 | 6N/10N/15N/20N |
| D4X5 | 4.00 | 5.00 | 4.50 | 0.80 | 1.05 | 3.00 | 5N/10N/15N/20N/25N |
| D5X6 | 5.00 | 6.00 | 5.50 | 1.00 | 1.35 | 4.00 | 10N/25N/35N |
| D6X7 | 6.00 | 7.00 | 6.50 | 1.00 | 1.90 | 5.00 | 15N/30N/45N |
| D8X9 | 8.00 | 9.00 | 8.50 | 1.35 | 2.35 | 6.00 | 12N/27N/40N/70N |
| D10X13 | 10.00 | 13.00 | 11.00 | 2.00 | 3.20 | 8.00 | 27N/40N/70N |
| D12X16 | 12.00 | 16.00 | 13.00 | 2.00 | 3.50 | 10.00 | 27N |

ANTI-THEFT RADIO ANTENNA DEVICE WITH ORIENTATION CONTROL

FIELD

The disclosure below relates to radio antenna devices that help deter antenna theft and provide antenna orientation control.

BACKGROUND

As recognized herein, current vehicle antennas are easy to unscrew or otherwise disengage from the vehicle itself. This in turn allows the antennas to be stolen relatively easily. Additionally, even where theft is combatted with a thread-locking compound to lock the screw threads of the vehicle with the screw threads of the antenna, the locking compound is often too weak and hence can be easily overcome in the event of theft. In other instances, the locking compound is too strong and therefore prevents the vehicle's owner from being able to disengage the antenna from the vehicle when desired without damaging the antenna, vehicle, or both.

Additionally, since the antenna itself often has a fixed threaded base, it is often difficult or impossible to get the antenna's decorative aspects to face whatever user-specific direction(s) the user desires according to that individual's own personal preferences.

No adequate solutions currently exist to the foregoing technological problems.

SUMMARY

Accordingly, in one aspect a device includes an antenna adapter configured to receive an antenna and configured to engage an antenna mount. The antenna adapter includes a first element configured to assist in removable engagement of the antenna adapter with the antenna. The antenna adapter also includes a second element configured to maintain the antenna at a particular radial orientation with respect to the antenna adapter when engaged therewith.

Thus, in various example embodiments the antenna adapter may be configured to receive the antenna at a first end segment of the antenna adapter and may be configured to engage the antenna mount at a second end segment of the antenna adapter. The second end segment may be opposite the first end segment.

Also in various examples, the antenna adapter may be at least partially cylindrical along one or more segments thereof.

If desired, the first element may include a groove into which a third element is extendable to engage the antenna adapter with the antenna. The device may even include the third element. The third element may include a set screw, a C-clip, and/or a retaining ring.

Still further, in some example embodiments the second element may include a spring plunger that is configured to at least partially extend into an interior area of the antenna. The device may include the antenna itself in some examples. The antenna may include plural radially-spaced openings each of which may be configured to receive a same respective portion of the spring plunger that is extendable into the antenna to maintain the antenna at the particular radial orientation with respect to the antenna adapter. In certain specific examples, the second element, while the antenna adapter is engaged with the antenna, may inhibit axial rotation of the antenna with respect to the antenna adapter yet still permit axial rotation of the antenna with respect to the antenna adapter under force overcoming spring bias of the spring plunger.

In various examples, the antenna mount may be an antenna mount on a vehicle.

In another aspect, a method includes providing an antenna adapter configured to receive a vehicle antenna and configured to engage an antenna mount on a vehicle. The method also includes providing, as part of the antenna adapter, a first element configured to assist in removable engagement of the antenna adapter with the antenna. The method further includes providing, as part of the antenna adapter, a second element configured to maintain the antenna at a particular radial orientation with respect to the antenna adapter when engaged therewith.

In certain examples, the method may also include providing the vehicle antenna with the antenna adapter.

Also in certain examples, the first element may include a screw and/or a groove into which the screw can extend.

In still another aspect, an apparatus includes an antenna for a motor vehicle and an adapter for the antenna. The adapter is configured to slide inside an end of the antenna and is configured to threadably engage a mount of the motor vehicle in lieu of the antenna engaging the mount. The antenna is free to rotate on the adapter without causing the adapter to rotate on the mount. The apparatus also includes a retaining element configured to couple the adapter to the antenna to prevent the antenna from being pulled off of the adapter while still allowing the antenna to rotate on the adapter.

In some example implementations, the retaining element may include a screw.

Also in some example implementations, the apparatus may include an orientation element on the adapter. The orientation element may be configured to maintain the antenna at a particular radial orientation with respect to the adapter while the antenna is coupled to the adapter. The orientation element may be different from the retaining element.

The details of the present application, both as to its structure and operation, can best be understood in reference to the accompanying drawings, in which like reference numerals refer to like parts, and in which:

DETAILED DESCRIPTION

Figure 1:
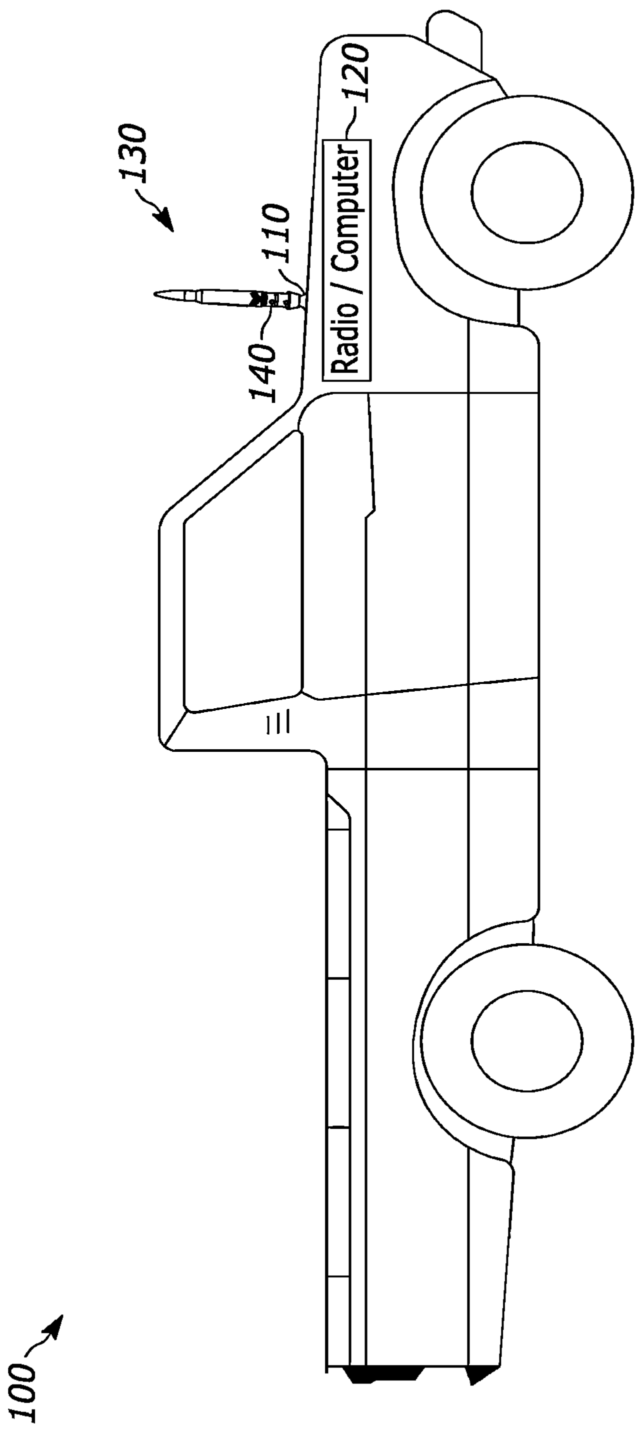
FIG. 1 shows a side view of a vehicle with an antenna and antenna adapter mounted to the vehicle's antenna mount consistent with present principles.

Consistent with present principles, antenna adapters may be used to affix antennas to vehicles and other objects in a manner that minimizes the potential for theft while keeping the visual aesthetics of the antenna oriented as desired by the user. The adapters may also help prevent damage due to antenna removal as described above, while still allowing for rotational orientation of the antenna as unique to the user's own desire. The antenna can also be swiftly removed and re-installed without damage using proper and unique tools.

Accordingly, an antenna adapter/assembly consistent with present principles may be configured for mounting a specific antenna to a given mount. The adapter may also be configured in a shape that is specific to the mount design itself. The adapter piece that is specific to the antenna may therefore act as an interface between the antenna and the vehicle mount, and may be made with smooth exterior and interior surfaces so that the adapter does not break when engaged with the antenna and/or mount (e.g., may have corners that are smooth/rounded). The lower half/portion of the antenna adapter may be designed to connect to a specific vehicle and may include male or female threads in various non-limiting examples. Different adapters may be configured for application to different vehicles by means of different adapter threads or other engagement elements.

The upper half/portion of the antenna adapter may be designed specifically to interface with the lower main part of the antenna itself. The defining overall shape of the upper half/portion of the adapter may be cylindrical in shape in certain non-limiting embodiments. The very top surface of the adapter may be flat, coned/convex, recessed, hollow or another design. The cylindrical shape of the adapter may connect to/interact with the lower main antenna body, creating a close fit (e.g., interference fit).

The antenna body and antenna adapter may therefore rotate axially independent of each other, even when engaged with each other. Little to no torque is therefore transmitted between the two bodies.

Additionally, a retaining element or feature may be used that holds the antenna body from moving up and down axially on the antenna adapter once installed on the antenna adapter. The retaining feature can include a set-screw that engages a groove in the adapter. A retaining clip may additionally or alternatively be engaged with the groove. These aspects function to allow the two bodies (antenna and adapter) to rotate axially while not being able to move up or down vertically with respect to each other. What's more, when the adapter is installed on the vehicle and the antenna body is installed over the adapter with the retaining device/element, the antenna can be rotated axially freely in the clockwise or counterclockwise direction without transmitting a torque to the antenna adapter threads to loosen and unscrew the adapter, preventing the antenna itself from being loosened from the mount along with the adapter (and removed). This provides advantages over antennas and mounts that only use threaded-type connections for instance, where the antenna can be removed by applying an unscrewing force to the antenna itself to unscrew it from the vehicle.

Additionally, in some examples engaging the antenna with the mount via the retaining device/adapter may involve use of tools that make it less likely for the antenna itself to be stolen but still allow for the owner of the antenna, equipped with the right tool(s), to easily and relatively effortlessly remove and replace the antenna without concern for damage.

As an additional aspect, since the antenna itself is free to spin three hundred sixty (360) degrees axially according to the longitudinal axis of the adapter with which it is engaged, methods for orientation control are enabled such that the user can align the antenna whichever direction the user pleases for his/her personal preference. In non-limiting examples, this may be accomplished via a spring-detent ball that detents into different parts of the antenna at incremental angles of rotation. Additionally or alternatively, other methods employing friction between the antenna adapter and the antenna body may also be used to control and stabilize the rotational orientation (e.g., an interference fit between the two bodies).

With the foregoing in mind, reference is now made to FIG. 1. This figure shows a vehicle 100, which in the present instance is a pickup truck. However, the vehicle 100 might also be a car, van, off road vehicle/ATV, semitrailer, motorcycle, motor home, boat, train, airplane, etc. In any case, as may be appreciated from FIG. 1, the vehicle 100 includes an antenna mount 110 that is electrically connected to a vehicle radio and/or onboard computer 120 of the vehicle 100. The mount 110 may therefore communicate terrestrial and/or satellite radio signals received from a connected antenna 130 to the radio/computer 120. The received signals may be frequency modulation (FM) signals, amplitude modulation (AM) signals, and/or XM signals in different examples. The radio/computer 120 may then generate corresponding audio signals that may then be output as audio via one or more speakers in the vehicle 100.

However, note that present principles are not necessarily limited to receipt of radio and satellite audio signals. Accordingly, antennas consistent with present principles may also include Wi-Fi antennas, Bluetooth antennas, ultra-wideband antennas, and other types of antennas including television antennas.

As also shown in FIG. 1, the antenna 130 may be bullet-shaped or another shape for an aerodynamic profile, reducing drag on the vehicle and making the vehicle more fuel-efficient compared to using other antennas such as original equipment manufacturer (OEM) antennas that create more wind resistance. As mentioned above, the antenna 130 may be both mechanically and electrically connected to the mount 110 via a conductive antenna adapter 140. The adapter 140 may therefore both receive the antenna 130 and engage the antenna mount 110.

In one example, the adapter 140 may receive the antenna 130 using an upper end segment with a groove in it as will be described further below. Also per this example, the adapter 140 may engage the antenna mount 110 via a threaded lower end segment. The lower end segment may engage reciprocal threads on the mount 110, just as the vehicle's stock or OEM antenna might. Any appropriate size of male and female reciprocal threads may therefore be used for the mount 110 and adapter 140. So, for example, the mount 110 may include female threads while the lower end segment of the adapter 140 may include male threads to screw into and removably engage with the female threads on the mount 110.

Additionally, since mount and antenna configurations may vary by vehicle manufacturer, different adapters of different types may be separately configured for different vehicle makes and models consistent with present principles. Also note that reciprocal screw threads need not necessarily be used and that other forms of removable engagement of the adapter 140 with the mount 110 may be used instead. These might include interference/snap fit engagement, cotter pins extendable through holes in the mount 110/adapter 140, and other types of configurations.

However, regardless of adapter shape and engagement means, adapters consistent with present principles may still be rigid and conductive. As such, the adapters may be made of one or more types of metal, such as aluminum, silver, copper, gold, iron, and/or steel (e.g., stainless steel). In certain specific example embodiments, the adapter may be made of 6061 solid billet aluminum. Other suitable materials may additionally or alternatively be used, including conductive polymers and other types of conductive materials, as well as various rubbers and plastics as desired.

Likewise, the antenna 130 itself may be rigid and conductive. As such, the antenna 130 may be made of one or more types of metal, such as aluminum, silver, copper, gold, iron, and/or steel. In certain specific example embodiments, the antenna 130 may be made of 6061 solid billet aluminum and may have a hard anodize black with ultraviolet fade resistance finish that helps prevent chipping and color fade. Other suitable materials may additionally or alternatively be used, including conductive polymers and other types of conductive materials.

Figure 2:
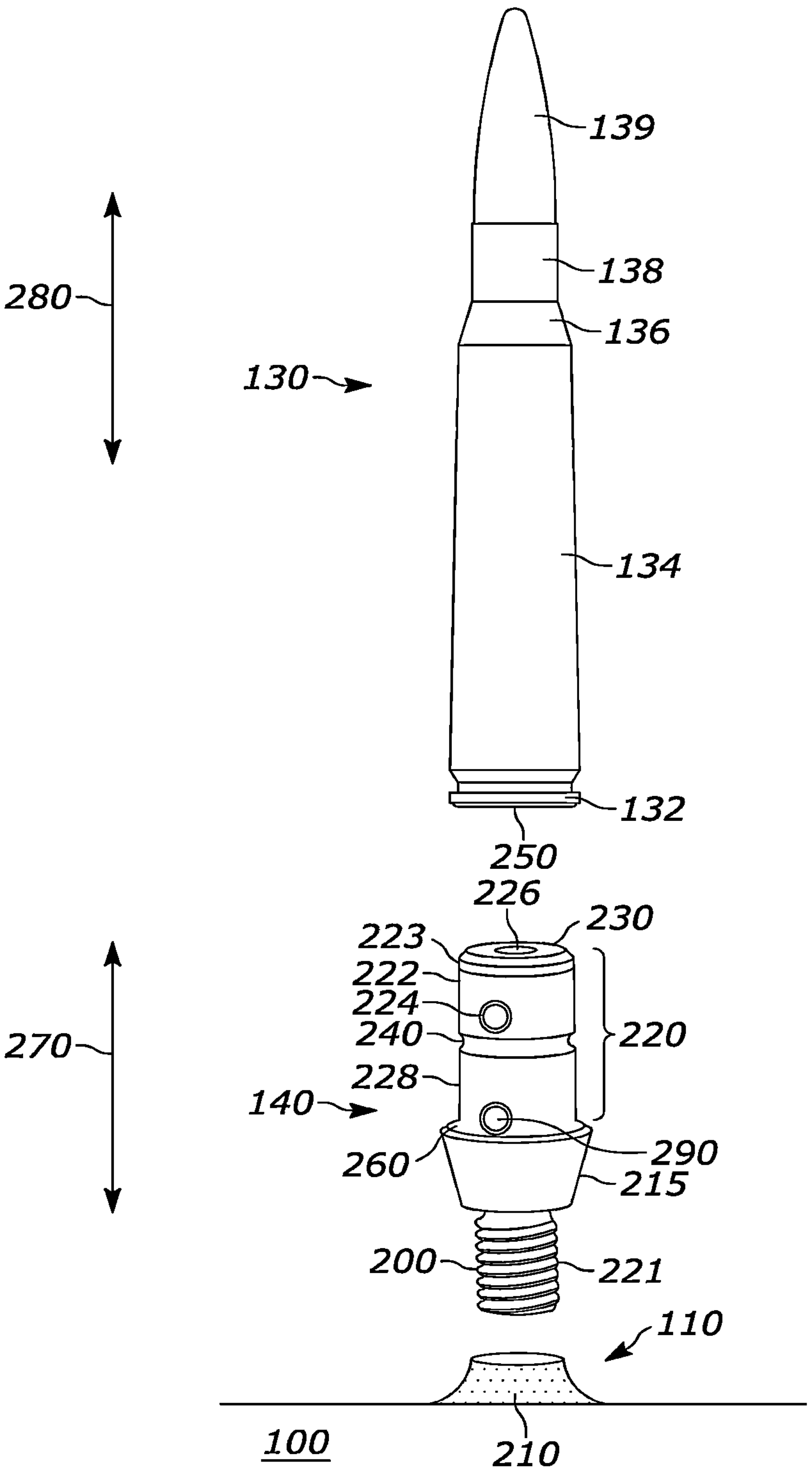
FIG. 2 shows a spaced-apart view of the mount, antenna, and adapter consistent with present principles.

FIG. 2 shows a spaced-apart view of the mount 110, antenna 130, and adapter 140. As may be appreciated from this figure, male threads 200 on a lower end segment 221 of the adapter may be screwed into female threads 210 on inner exposed sidewalls of a hole or opening in the mount 120. The hole or opening may therefore extend vertically within the central interior of the mount 120 as already configured to engage a stock or OEM antenna.

The antenna 130 may be in the size and/or shape of a fifty (50) caliber bullet/ammo round for improved aerodynamics. As such, the antenna 130 may have a bottom rim 132 as shown. The cartridge case may also have a frusto-conical section 134 above the rim 132 and that terminates in yet another frusto-conical section 136 that slopes inward at an even greater degree than the section 134. A cylindrical portion 138 above the section 136 establishes the other end of the cartridge itself, and the conical bullet 139 with rounded point extends out of that. Additionally, note that while a 50-caliber bullet is shown per this example, an antenna consistent with present principles may be configured in the size and/or shape of other aerodynamic bullet/cartridges as well (including .22 short, .22 long, 9 mm, .357 Magnum, .38 special, 40 caliber, .223 Remington, 5.56 NATO, etc.).

Turning to the adapter 140, it may be at least partially cylindrical. As such, the adapter 140 as shown in FIG. 2 is generally cylindrical along its upper end segment 220. Additionally, the top surface 230 of the adapter 140 may be generally flat in a plane perpendicular to the longitudinal axis 270 of the adapter 140. However, this upper surface 230 may also be coned/convex, recessed/concave, hollow, or another suitable shape based on a desired implementation.

As also shown in FIG. 2, the adapter 140 may include a first element, which in the present instance is a groove 240 or other equivalent type of opening or indentation located in the sidewalls of the upper end segment 220. The groove 240 or other element may circumscribe the sidewalls along the exterior surface of the segment 220 in a horizonal plane. Another element may then be extended into the groove 240 to engage the antenna adapter 140 with the antenna 130. The other element may be/include a set screw, a C-clip, a retaining ring, or another type of coupler.

Therefore, in one specific implementation, the coupler may extend through a hole in the antenna 130 and into the groove 240 after the antenna 130 has been slid over the upper end segment 220 until the lower/bottom horizonal face 250 of the antenna 130 abuts a horizonal ridge 260 on the adapter 140 that extends laterally away from the adapter 140, which in turn aligns the hole in the antenna 130 with the groove 240. The set screw or other coupler may then be extended into the groove 240 and remain extended when the antenna 130 is rotated axially with respect to the adapter 140 according to the long axes 270, 280 of the adapter 140 and antenna 130. The axes 270, 280 themselves may be parallel if not coaxial.

Accordingly, when the antenna 130 is engaged with the adapter 140 via the groove 240 and set screw (or other coupling element), the antenna 130 may rotate axially clockwise or counterclockwise independent of the adapter 140 (e.g., rotate while the adapter 140 remains stationary). So little torque may be transmitted between the antenna 130 and adapter 140 according to this configuration that the adapter 140 (and hence antenna 130) may not be unscrewed from the mount 110 by rotating the body of the antenna 130 itself, reducing the potential for theft.

To also reduce the potential for theft and owing to the set screw or other element extending into the groove 240, the set screw may prevent the antenna 130 from being moved up or down vertically with respect to the adapter 140, meaning the antenna 130 cannot be easily slid off the adapter 140 by merely applying upward force to the antenna body with one's hand.

Therefore, in certain non-limiting examples the length of the set screw may be configured so that the screw extends, when fully screwed in, from an exterior surface of the antenna 130 (with which its head sits flush) and into the groove 240, but may not be long enough to engage or contract the apex/inner apogee of the groove 240 itself, allowing the aforementioned axial rotation with little to no torque applied between the antenna 130 and adapter 140. Alternate coupling elements, such as a C-clip or retaining ring, may be similarly configured to sit flush with the exterior surface of the antenna 130 but not engage the apex/inner apogee of the groove 240. Additionally note that, regardless of coupling type, the screw or other element may sit flush with the exterior surface of the antenna 130 not just for aesthetics but also to reduce wind drag.

FIG. 2 also shows that the adapter 140 may include yet another element configured to maintain the antenna 130 at a particular radial orientation with respect to the antenna adapter 140 when engaged therewith. In certain non-limiting examples, this element may include a spring plunger 290 configured to at least partially extend into any of plural interior, radially-spaced holes or other inner areas/openings in the antenna 130. Each radially-spaced opening may be configured to receive a same respective portion of the spring plunger that is extendable into the antenna 130 to maintain the antenna 130 at a particular radial orientation with respect to the antenna adapter 140.

Accordingly, the spring plunger 290 may include a spring inside its body that forces a dome-shaped plunger knob outward under spring bias. The knob may thus extend laterally beyond the periphery of the cylindrical lower section 228 of the upper end segment 220 (cylindrical section below the groove 240) under spring bias, but may be pushed inward to sit flush with the periphery of the section 228 by overcoming the spring bias.

Spring bias may therefore be overcome once the upper segment 220 is inserted into a cylindrical cavity or hole in the antenna 130 (that has an opening at the lower/bottom horizonal face 250) and the antenna 130 is rotated axially. This action pushes the knob inward (in a lateral direction perpendicular to the long axis 270) as the knob is forced out of one of the radially-spaced holes due to the rotation. This aspect will be discussed in greater detail in reference to FIGS. 3A-3C, as will the set screw coupling element. But for now, understand that the plunger 290 may, while the antenna adapter 140 is engaged with the antenna 130, inhibit axial rotation of the antenna 130 with respect to the antenna adapter 140 yet still permit axial rotation of the antenna 130 with respect to the antenna adapter 140 under force overcoming the spring bias of the spring plunger 290.

Figure 3A:
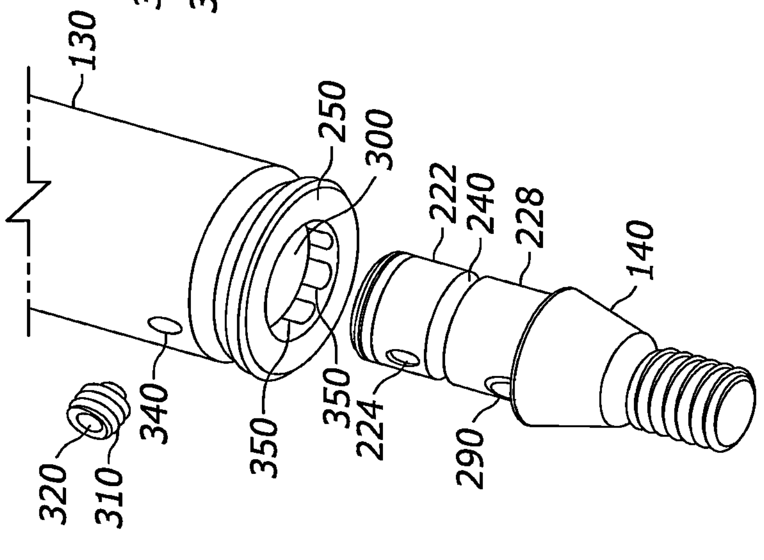
FIGS. 3A-C show perspective views of the adapter being engaged with the antenna consistent with present principles.
Figure 3B:
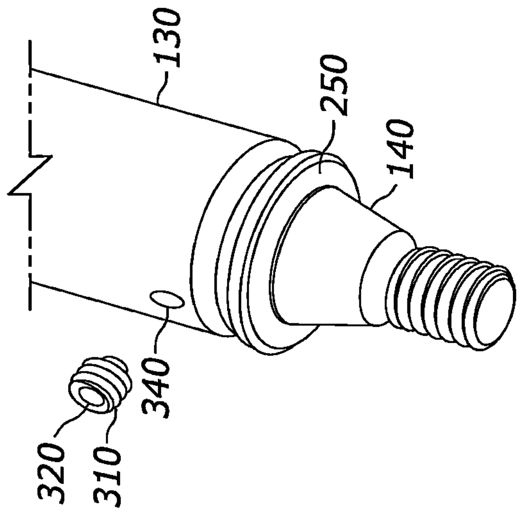
Figure 3C:
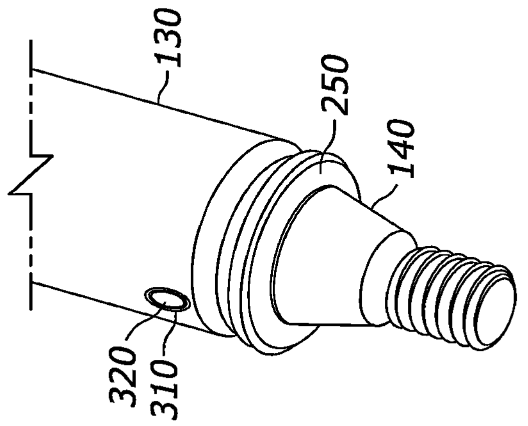

However, before describing FIGS. 3A-3C, note with respect to FIG. 2 that the upper surface 230 and cylindrical upper section/surface 222 of the upper end segment 220 (cylindrical section above the groove 240) may include additional holes or openings 224, 226 in fluid communication with each other. For example, the openings may be cylindrical tubes fluidly connected to each other. The one or more sidewall openings 224 on the section 222 may even be configured, on at least an outer portion thereof, in a hexagonal shape of a predetermined size so that an authorized user with the correct hex wrench/Allen wrench can insert the tool into the opening 224 and use the tool's leverage to relatively easily screw/unscrew the adapter 140 from the antenna mount 110. As for the opening 226 on the upper surface 230, it may be provided as a vent to vent air that might otherwise compress within or get trapped within the rest of the inner chamber established by the opening(s) 224 when the end-user uses a wrench or other tool to mount the adapter 140 on the mount 110 as just described.

Also note before moving on to other figures that the cylindrical upper section 222 may include an O-ring or washer-style ring 223 either made of black rubber (or other material) or made integral with the rest of the section 222. Either way, the ring 223 may be disposed between the main body of the section 222 and the top surface 230. Further, as may also be appreciated from this figure, the top surface 230 may include outer edges that slope down obliquely to meet the ring 223, and the ring 223 itself may be rounded in the vertical dimension in addition to being circular in the horizontal plane. The apex of the vertical rounding being at a vertical midpoint of the ring 223.

What's more, FIG. 2 shows that beneath the ridge 260, the adapter walls may form an inverted conical frustrum 215 with sidewalls sloping downward and inward as shown. The bottom face of the conical frustrum 215 may then meet the male threads 200 as shown. This conical frustrum 215 may provide not only aesthetic appeal but also, in at least some implementations, a tight-fitting relationship with the antenna and mount and a smooth surface between the three components to prevent breaking.

Reference is now made to FIGS. 3A-3C. These figures show lower perspective views of the adapter 140 being engaged with the antenna 130. More specifically, these figures show how the antenna 130 may interface with the adapter 140 using a set screw retaining method, where the set screw is partially threaded so that once screwed in the screw sits part way into the groove 240 of the adapter 140.

As shown in FIG. 3A, the adapter's upper section 220 (combination of the sections 222, 228, and groove 240) has not yet been inserted into a hollow cylindrical inner area 300 of the antenna 130. FIG. 3B then shows the upper section 220 as inserted into the area 300. FIG. 3C then shows that a set screw 310 configured with a hexagonal hole 320 for engaging a hex wrench/Allen wrench (e.g., the same wrench having a certain size to engage the hole(s) 224) may be screwed into a sidewall hole 340 in the lower section of the antenna 130 using the wrench.

Before moving on to the description of other figures, note particularly with respect to FIG. 3A that the inner sidewalls of the antenna 130 that define the hollow inner area 300 may include, on lower end portions thereof, respective radially-spaced holes/openings 350 in a same horizontal plane with respect to the long/vertical axis 280. The holes 350 may each be configured to closely receive the dome-shaped plunger knob of the spring plunger 290.

Accordingly, once the adapter 140 has been engaged with the antenna 130 as shown in FIGS. 3B and 3C, the antenna 130 may be rotated axially with respect to the adapter 140 so that the plunger knob may be aligned with and inserted into a respective hole 350 owing to the spring bias of the plunger 290 forcing the knob into the hole 350 when aligned therewith. Then as the antenna 130 continues to be rotated, spring bias may be overcome as the knob is forced out the respective hole 350 it is in and across a ridge between respective holes 350 before possibly being aligned with another hole 350 (in which case the spring bias may again force the knob into the next respective hole 350 with which it is aligned). This aspect therefore allows the user to relatively easily turn the antenna 130 to a desired radial orientation with respect to the mount 110 and/or vehicle itself and then let the plunger 290 maintain the antenna 130 in that orientation notwithstanding vehicle vibrations and the passing of wind that might be experienced while driving.

Figure 4:
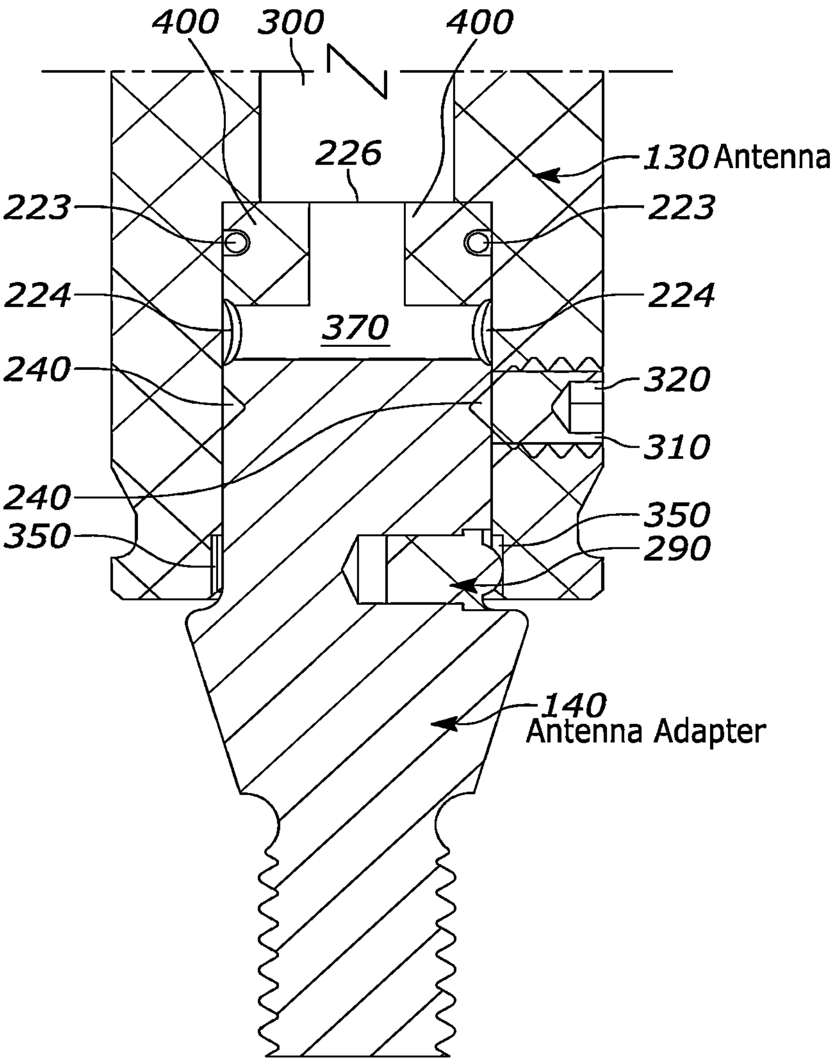
FIG. 4 shows a cross-sectional side view of the antenna as removably engaged with the antenna adapter consistent with present principles.

Reference is now made to FIG. 4. This figure shows a cross-sectional side view of the antenna 130 as removably engaged with the antenna adapter 140 via the fitting together of the reciprocal cylindrical elements of the antenna 130 and adapter 140 and also the insertion of the set screw 310 into the groove 240. As mentioned above, the set screw 310 may sit partially inside the groove 240, with it being reiterated again that other elements besides a set screw might additionally or alternatively be used. Those elements might include a C-clip and/or retaining ring.

As also shown in this figure, the plunger 290 has been engaged with a respective hole 350 in the inner cylindrical surface of the antenna 130, allowing the antenna 130 to be held to a user's specified orientation.

FIG. 4 also shows that the fluidly-connected holes 224, 226 collectively establish a hollow inner chamber 370. The holes 224, 226 may therefore establish intersecting hollow cylindrical tubes bored through or otherwise formed into the adapter 140. Further note here that the adapter 140 according to FIG. 4 has two opposing holes/openings 224 that are opposite each other on the sidewalls of the cylindrical upper section 222.

As may also be appreciated from FIG. 4, the hollow cylindrical inner area 300 may include two sections arranged along the axis 280. The lower section that receives the adapter 140 may have a larger diameter, and the upper section above the adapter 140 may have a smaller diameter to create a ridge 400 that abuts the top surface 230 when the adapter 140 is fully disposed within the area 300. The upper section of the area 300 may thus remain hollow even after the adapter 140 has been engaged with the antenna 130.

Figure 5:
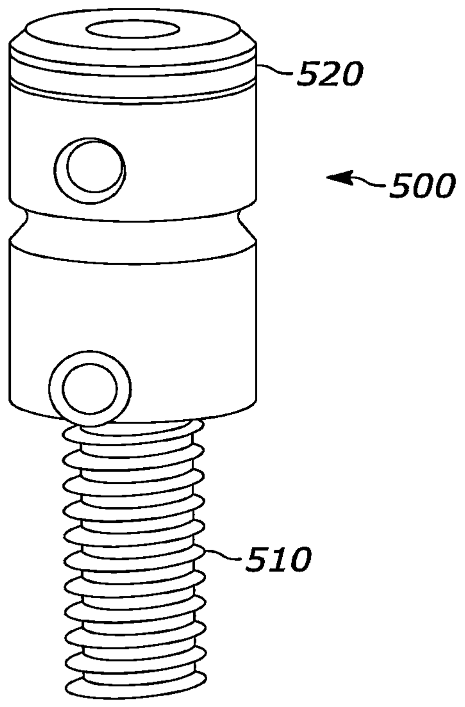
FIG. 5 shows a perspective view of another example antenna adapter consistent with present principles.
Figure 6B:
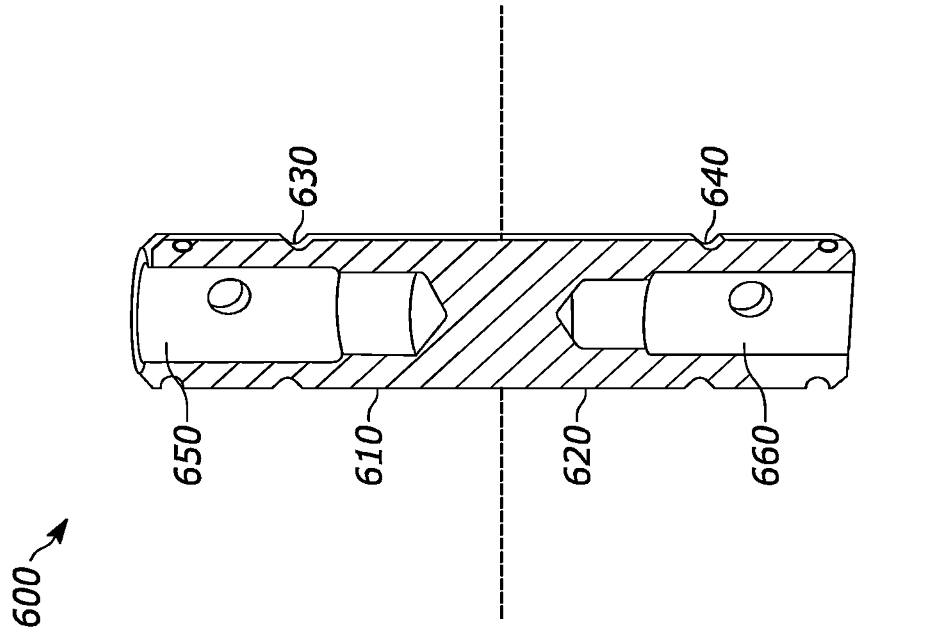
FIGS. 6A and 6B show respective side and cross-sectional perspective views of yet another example antenna adapter consistent with present principles.
Figure 6A:
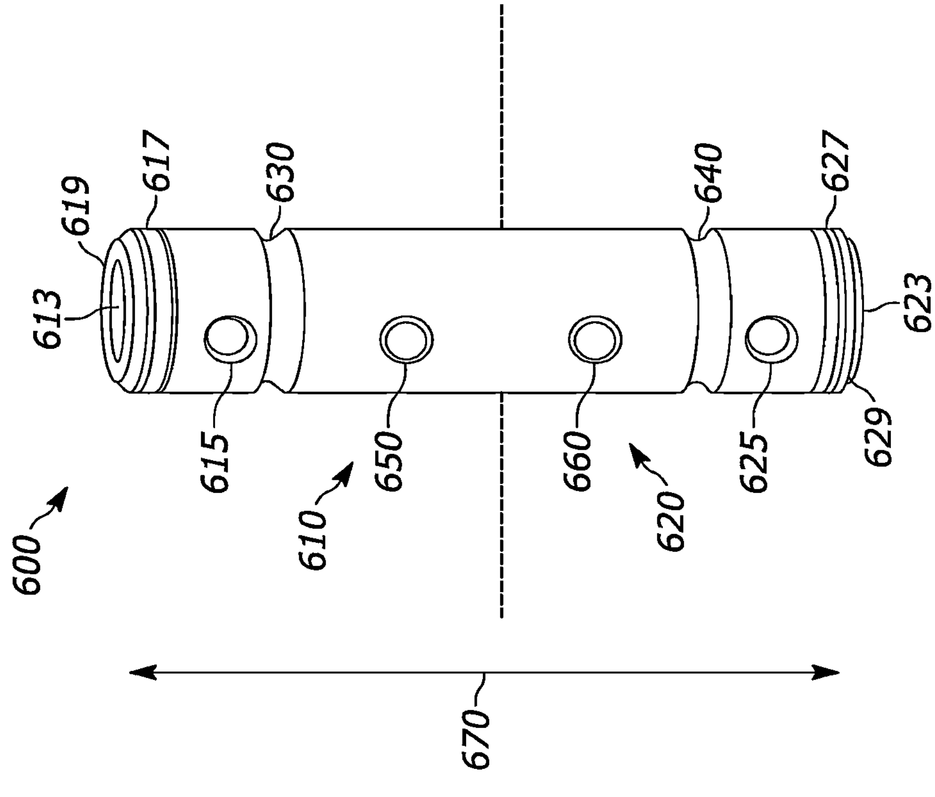

Turning to FIGS. 5 and 6A-6B, these figures show other example adapters that may be used consistent with present principles. These other example adapters might be used when engaging an antenna/adapter combination with an antenna mount of a different vehicle make and/or model than the one associated with the adapter 140. Note that the adapters shown in these figures may be configured the same as the adapter 140 save for differences set forth below and, as such, each of them may receive the same antenna 130 without altering the configuration or dimensions of the antenna 130 itself.

Specifically in reference to FIG. 5, an adapter 500 is shown. The adapter 500 may be similar to the adapter 140 but may not include the conical frustrum 215. As such, the adapter 500 may have male threads 510 similar to those on the adapter 140, but possibly with a different, smaller diameter. The adapter 500 may also include an O-ring/washer 520 similar to the ring 223.

Turning to FIGS. 6A and 6B, these figures show yet another example adapter 600 consistent with present principles. The adapter 600 may be used for vehicles with male-threaded antenna mounts established in part by a vertical male-threaded post that extends upward out of the surface of the vehicle.

The perspective view of FIG. 6A shows the adapter 600 as having similarly-configured lengthwise halves 610, 620 that may each be cylindrical. Each half 610, 620 may include one or more respective sidewall openings 615, 625 that may be similar to the sidewall openings 224. Each half 610, 620 may also include a groove 630, 640 similar to the groove 240. Each half 610, 620 may further include a washer-style O-ring ring 617, 627 similar to the washer-style ring 223, as well as a respective horizonal face 619, 629 similar to the surface 230. As such, the faces 619, 629 may respectively include openings 613, 623 similar to the opening 226 and may therefore be in fluid communication respectively with the sidewall openings 615, 625 (as well as each other in some examples). FIG. 6A also shows that the halves 610, 620 may include spring plungers 650, 660 similar to the plunger 290.

It may therefore be appreciated based on FIG. 6A that the adapter 600 may be flipped vertically one way or the other to engage a given post of a given size on a vehicle's antenna mount. With this in mind, reference is now made to the cross-sectional perspective view of FIG. 6B.

Note that different vehicle models, even from the same manufacturer, might have different-sized antenna mount posts and/or different-diameter male threads on the bottom of the posts for engaging an antenna (or in this case, antenna adapter). For instance, the post might be an M6 post or M7 post, and as such, the diameter of the opening 613 may be configured to receive an M6 post into hollow cavity 650 (similar to cylindrical inner area 300). The male threads of the M6 post may then be engaged with reciprocal female threads on a distal portion of the inner cylindrical surface defining the cavity 650, with the user screwing the adapter 600 onto the M6 post.

Likewise, the diameter of the opening 623 may be configured to receive an M7 post into cavity 660 (also similar to cylindrical inner area 300). The male threads of the M7 post may then be engaged with reciprocal female threads on a distal portion of the inner cylindrical surface defining the cavity 660, with the user screwing the adapter 600 onto the M7 post.

Thus, a single adapter 600 may be provided to a user owning a vehicle of a certain make/manufacturer that is known to use both M6 and M7 antenna mount posts, saving materials costs and aiding with user installation. Also note that other sizes besides M6 and M7 are encompassed by present principles.

Figure 7:
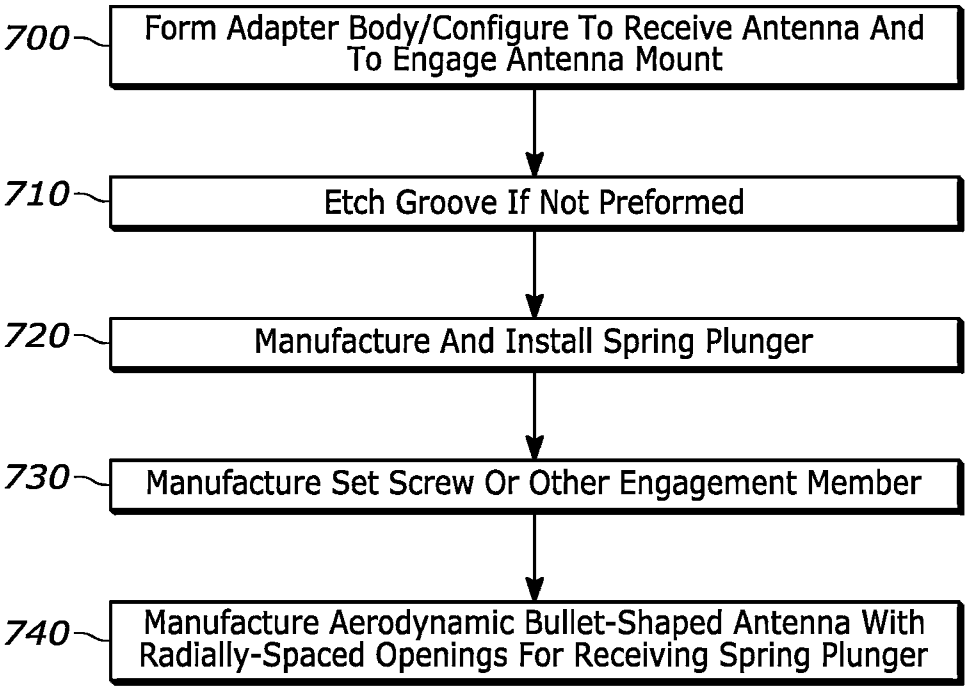
FIG. 7 shows a flow chart of manufacturing steps that may be performed consistent with present principles.

Turning now to FIG. 7, an example process flow is shown for a method of manufacture of a device consistent with present principles. Beginning at step 700, an antenna adapter body may be formed or configured to receive an antenna and engage an antenna mount. This may be done by forming the adapter body using computer numerical control (CNC) machining, other subtractive manufacturing techniques, injection molding, 3D printing, or other methods to configure the body according to the specifications set forth herein.

The process may then move to step 710 where one or more grooves may be etched into the sidewalls of the adapter body, if the groove(s) was not pre-formed at step 700. Note that the etched groove(s) may be similar to the groove 240, for example.

From step 710 the process may then move to step 720. At step 720 one or more spring plungers like the plunger 290 may be manufactured and installed on the adapter body. Then at step 730 one or more set screws like the screw 310 (or other engagement members as discussed above) may be manufactured.

Thereafter, at step 740 an aerodynamic bullet-shaped antenna may be manufactured. As such, the antenna may include plural radially-spaced openings for receiving the spring plunger that was manufactured at step 720. The antenna itself might be manufactured through CNC machining, other subtractive manufacturing techniques, injection molding, 3D printing, etc.

Figure 8A:
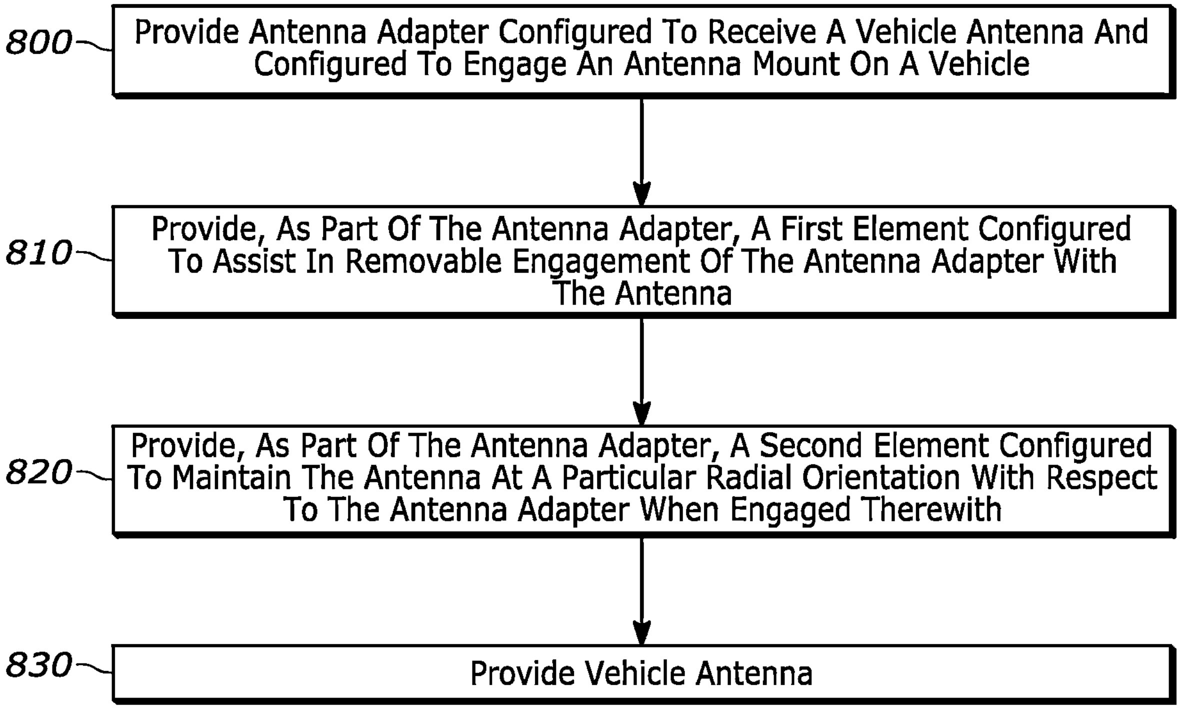
FIG. 8A shows a flow chart of example providing steps that may be performed consistent with present principles.

Moving on to FIG. 8A, this figure shows an example process flow for a method of providing a device consistent with present principles. The providing steps of this figure may or may not include the manufacturing steps discussed above in reference to FIG. 7. The providing steps of this figure may additionally or alternatively include transferring various items business to business, shipping the various items to consumers or other parties, and/or selling the items to consumers or other parties.

In any case, the process may begin at step 800 where an antenna adapter may be provided that is configured to receive a vehicle antenna and that is configured to engage an antenna mount on a vehicle. The process may then proceed to step 810 where one or more first elements may be provided as part of the antenna adapter. The first element(s)

may be configured to assist a user in removable engagement of the adapter with the antenna and, as such, may include a groove and/or a coupling element such as a set screw, C-clip, etc.

From step 810 the process may then proceed to step 820. At step 820 a second element may be provided as part of the antenna adapter. The second element may be configured to maintain the antenna at a particular radial orientation with respect to the antenna adapter when engaged therewith. So, for example, the second element might be a plunger such as the plunger 290. Then at step 830 the aerodynamic bullet-shaped antenna itself may be provided.

Figure 8B:
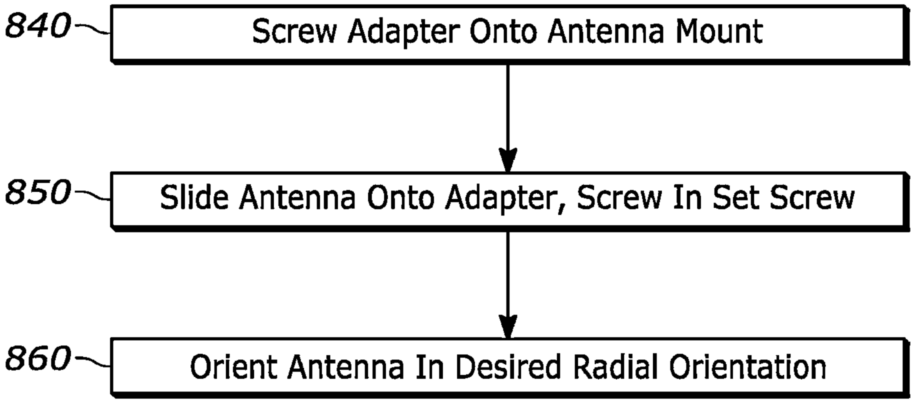
FIG. 8B shows a flow chart of example installation steps that may be performed by an end-user consistent with present principles.

Turning to FIG. 8B, this figure then shows steps in a process that an end-user might use once the device has been provided to him or her. At step 840, the user may screw an antenna adapter consistent with present principles onto an antenna mount of a vehicle. Then at step 850 the user may slide the bullet-shaped aerodynamic antenna over/onto the mounted adapter and screw in the adapter's set screw to removably engage the antenna with the adapter. Thereafter the process may proceed to block 860 where the user may twist the mounted antenna to orient the antenna in a desired radial orientation with respect to the longitudinal axis of the adapter, with the plunger 290 then maintaining the antenna in that orientation (e.g., until the user turns the antenna again). Thus, the user might orient the antenna for the antenna logo to either face forward in the same direction as the vehicle itself or to face outward orthogonally with respect to the forward axis of the vehicle.

Figure 9B:
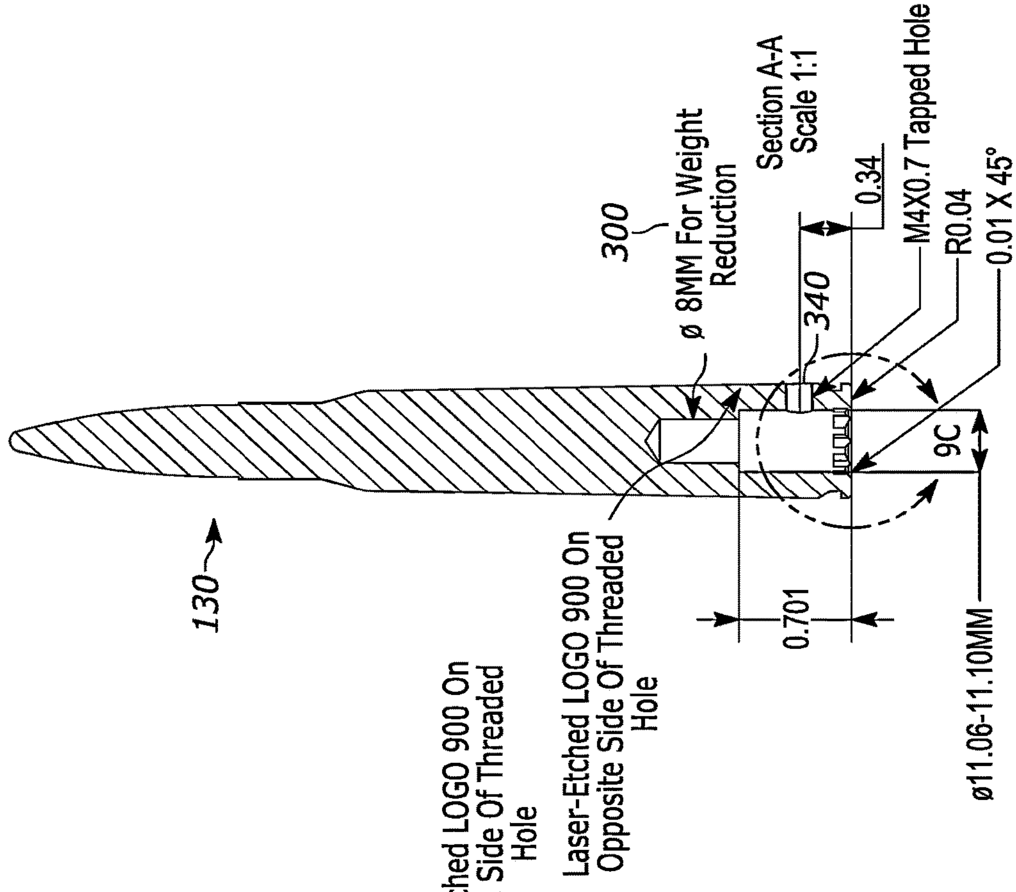
FIGS. 9A-9E show example specifications for an aerodynamic bullet-shaped antenna consistent with present principles.
Figure 9A:
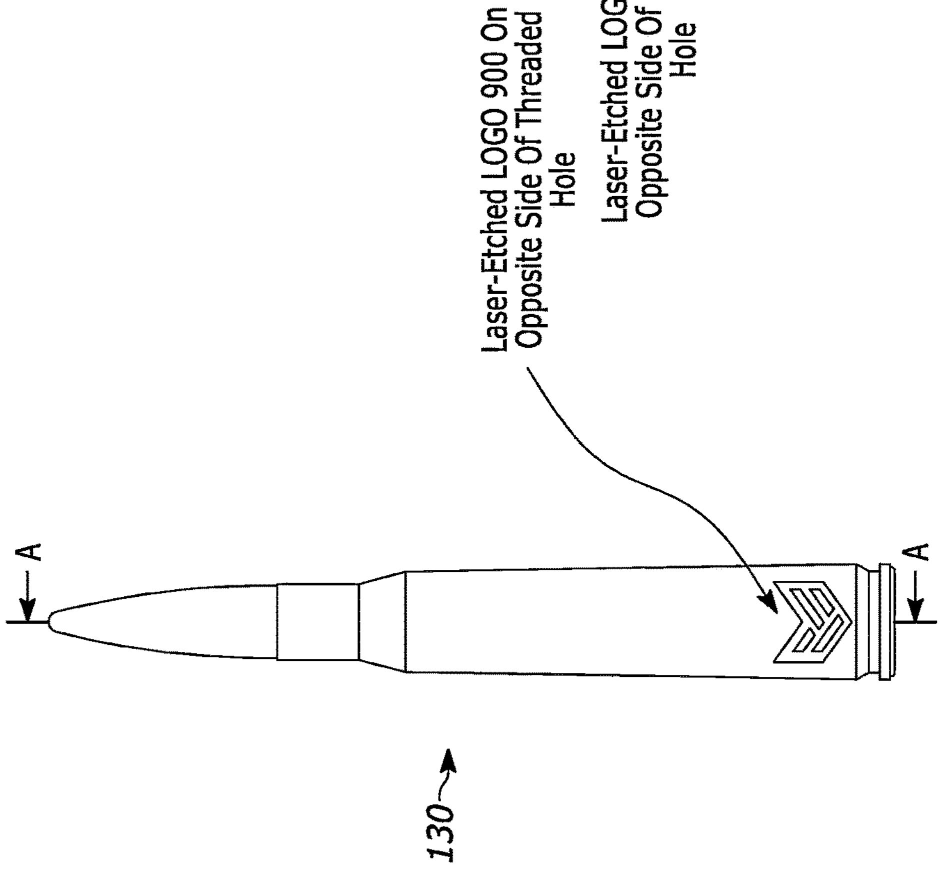
Figure 9C:
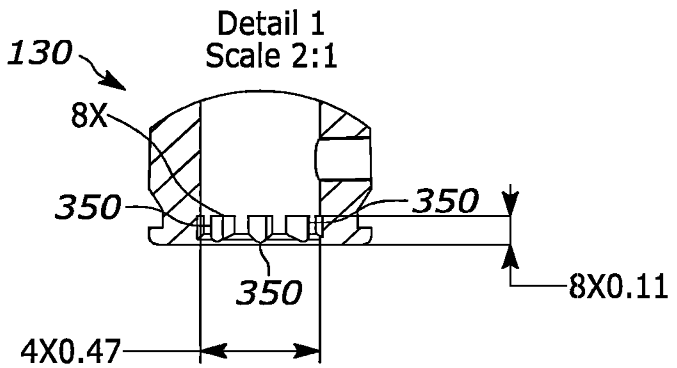
Figure 9D:
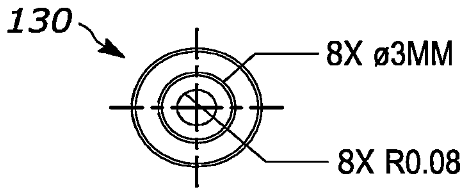
Figure 9E:
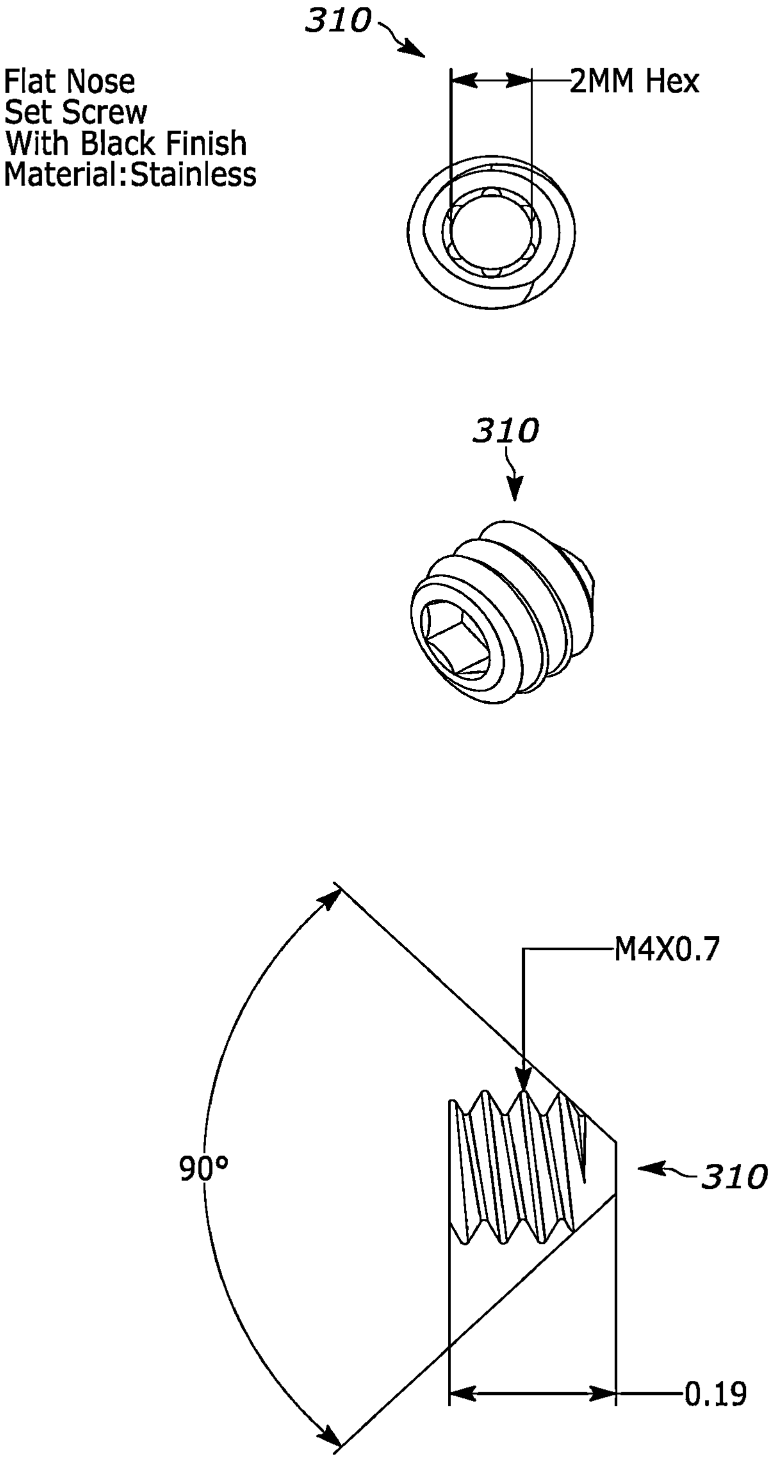

Now in reference to FIGS. 9A-E, these figures show example specifications for the aerodynamic bullet-shaped antenna 130 consistent with present principles. FIG. 9A shows the antenna 130 in side elevational view, FIG. 9B shows the antenna 130 in side cross-sectional view, FIG. 9C shows the bottom portion of the antenna 130 in enlarged partial side view, and FIG. 9D shows a bottom plan view of the antenna 130. Additionally, FIG. 9E shows perspective, side elevational, and screw head/top plan views of the set screw 310. Note that the set screw 310 may be a flat nose set screw with a black finish all around or possibly everywhere but the end of the screw 310 opposite the head. The set screw 310 may be made of stainless steel if desired. Also if desired, the threads of the set screw 310 may be coated with an anti-seize coating to make screwing/unscrewing easier.

Also note that a laser-etched logo 900 may be provided on a lower portion of the antenna 130 to assist with alignment of the antenna 130 on the mount in a user-desired radial orientation. The logo 900 may be on an opposite side of the antenna 130 as the threaded opening 340 for the set screw 310.

Further note that the upper section of the area 300 may be hollow according to the specification shown for weight reduction of the antenna 130.

Additionally, while recognizing that drawings form part of the specification in the United States, for completeness it is noted that the product dimensions and other specifications and information set forth in FIGS. 9A-E, as well as the other figures discussed below, are incorporated by reference into this detailed description. Also note that the product dimensions of FIGS. 9A-20 are expressed in inches unless stated otherwise (e.g., with millimeters being abbreviated "MM").

Now in reference to FIGS. 10A-F, these figures show various example specifications for the adapter 600 consistent with present principles. Here the adapter 600 may be made of 303 stainless steel. The adapter 600 may not include any finish, or may include a polished finish.

Figure 10B:
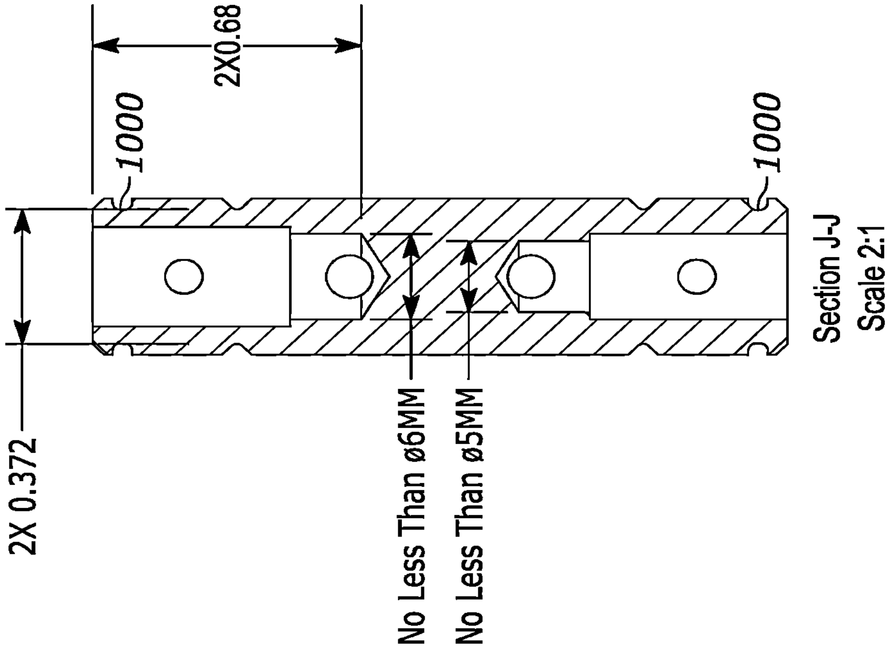
FIGS. 10A-11C show example specifications for the example adapter of FIG. 6 consistent with present principles.
Figure 10A:
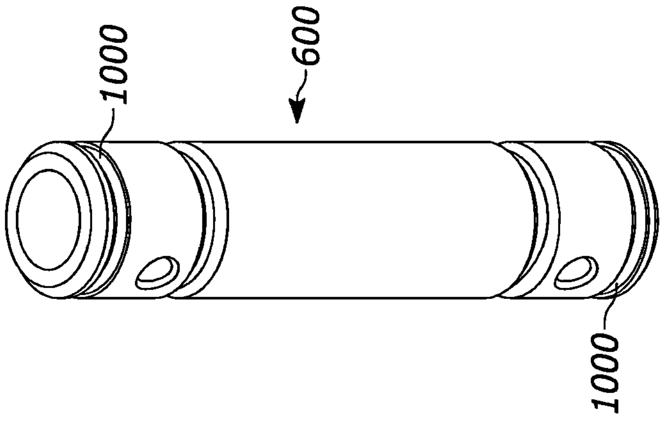
Figure 10D:
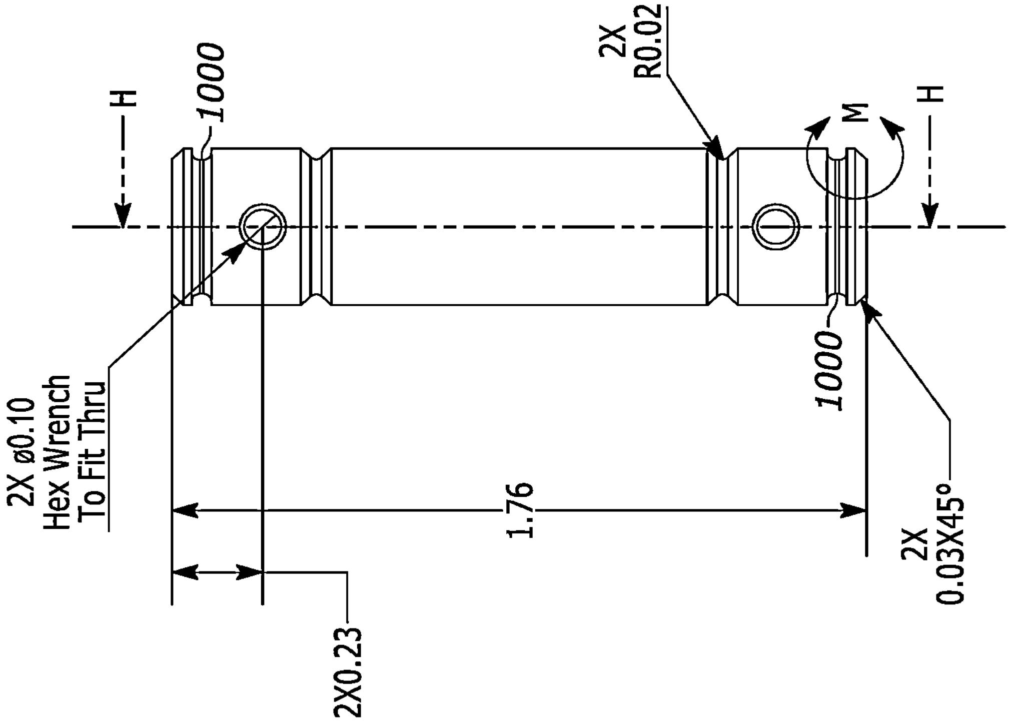
Figure 10C:
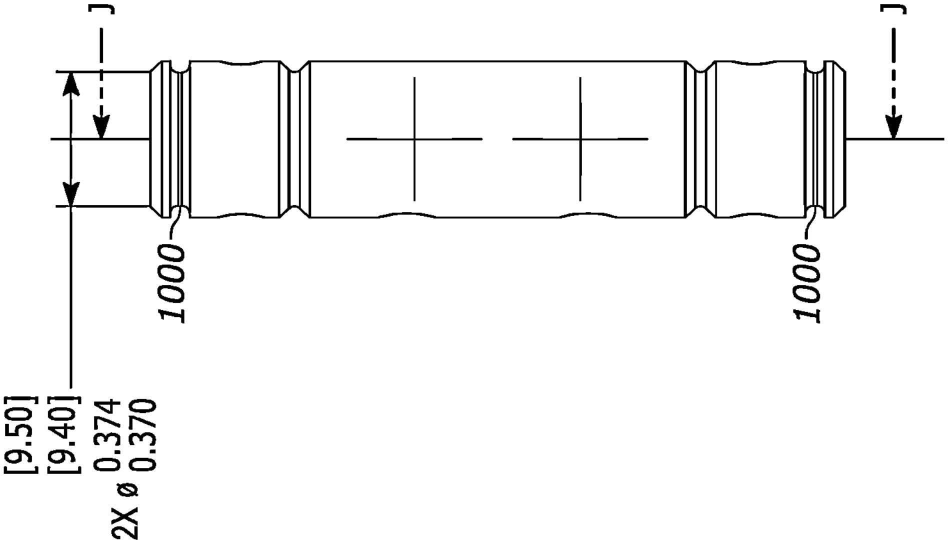
Figure 10E:
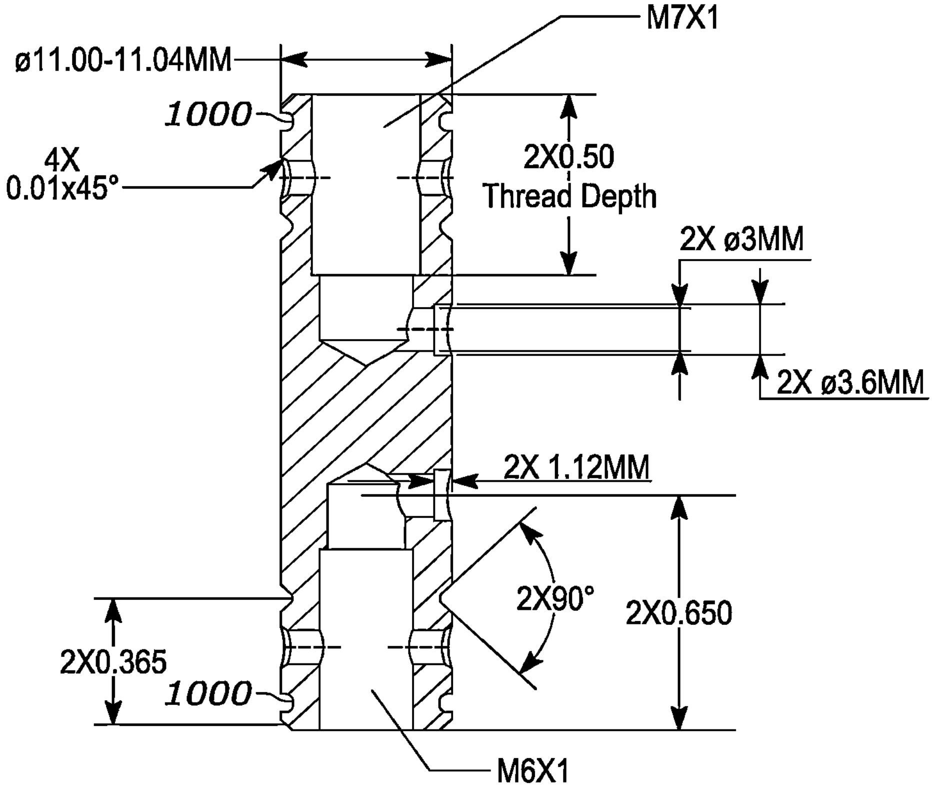
Figure 10F:
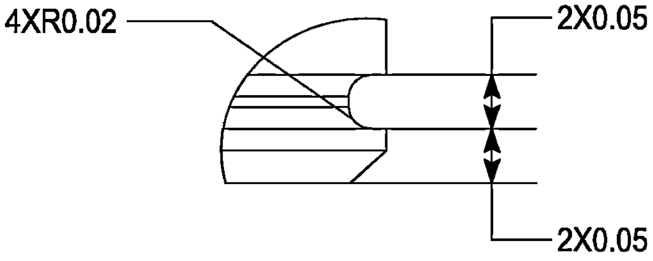

FIG. 10A shows the adapter 600 in perspective view, FIG. 10B shows the adapter 600 in front side cross-sectional view, FIG. 10C shows the adapter 600 in rear side elevational view, FIG. 10D shows the adapter 600 in front side elevational view, FIG. 10E shows the adapter 600 in rear side cross-sectional view, and FIG. 10F shows a bottom section of the adapter 600 in partial side elevational view.

Of note here is that a respective notch 1000 may be included on and circumscribe each cylindrical end segment of the adapter 600 in a transverse/horizontal plane. The two notches 1000 at opposing end segments may thus each receive a respective rubber O-ring 617, 627 as described above.

Also of note is that the overall length of the adapter 600 according to its longitudinal axis may be in the range of 1.5 to 2.0 inches, and preferably may be 1.76 inches in non-limiting example embodiments. Additionally, the overall width/depth of the adapter (as a diameter owing to the cylindrical configuration) may be in the range of 11.00 to 11.04 millimeters.

Figure 11A:
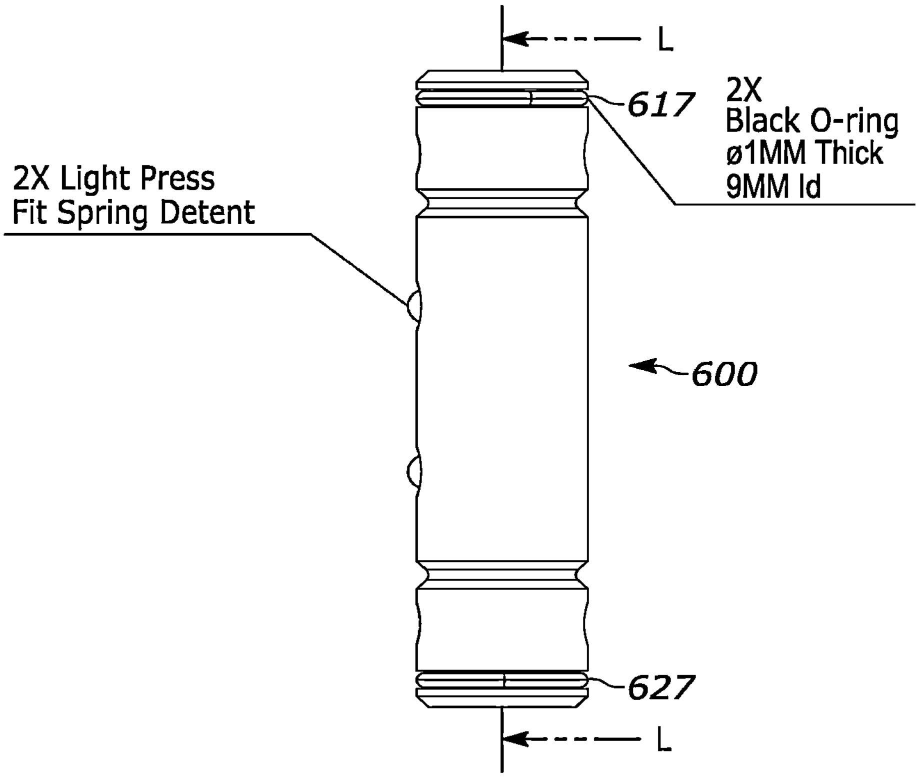
FIGS. 11D and 11E show example specifications for the adapter of FIG. 6 per installation on an antenna consistent with present principles.
Figure 11B:
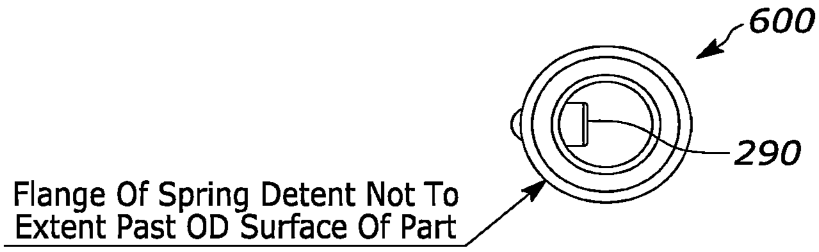
Figure 11C:
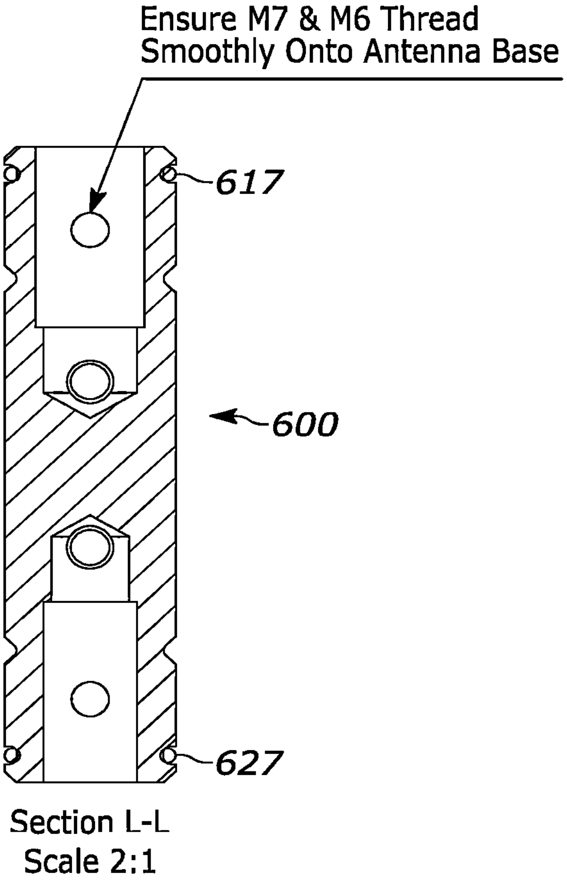
Figure 11D:
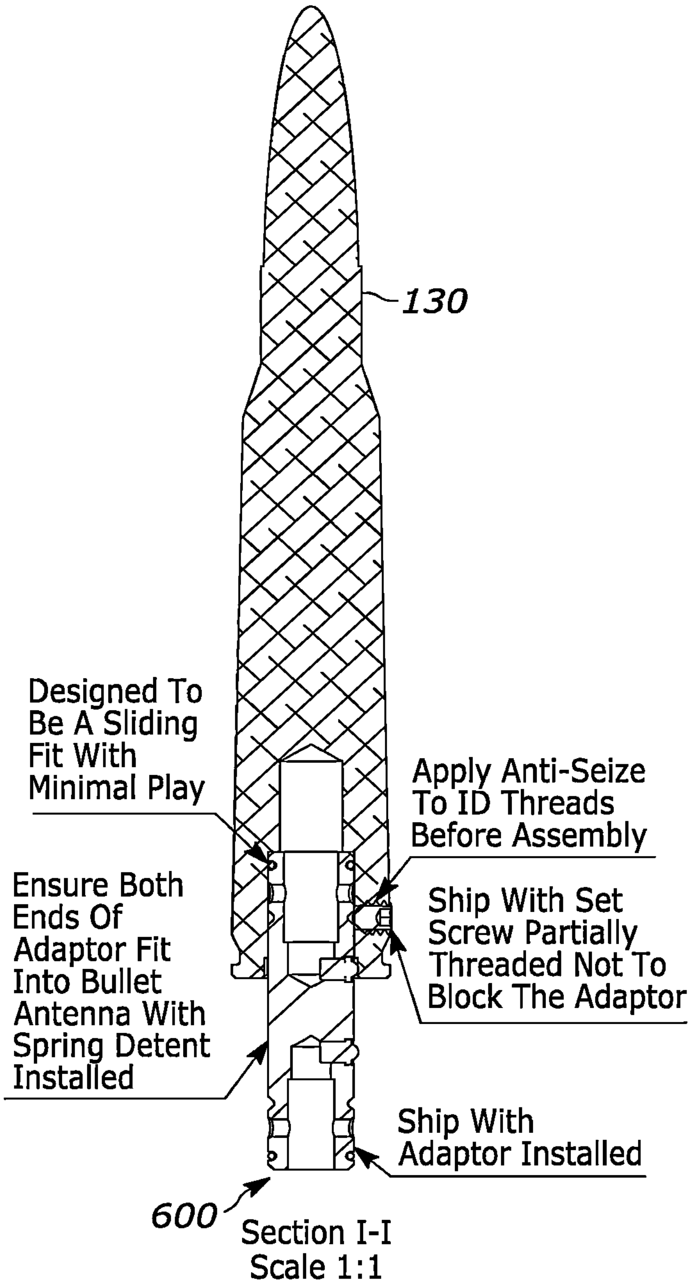
Figure 11E:
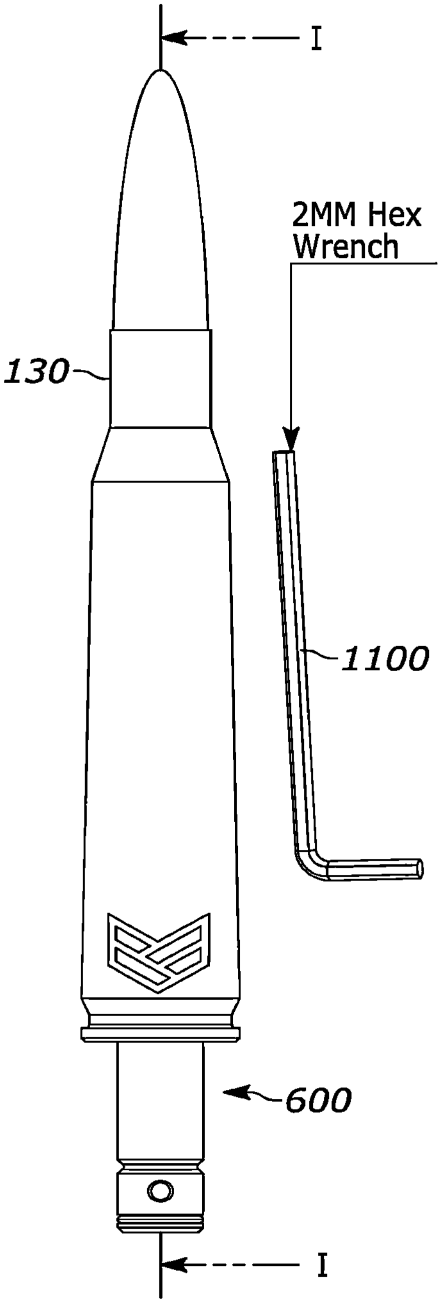

Now in reference to FIGS. 11A-E, these figures also show various aspects of the adapter 600, some in relation to the antenna 130. FIG. 11A shows a side elevational view of the adapter 600 itself, FIG. 11B shows a top or bottom plan view of the adapter 600, and FIG. 11C shows a side cross-sectional view of the adapter 600. FIG. 11D then shows a side cross-sectional view of the adapter 600 as coupled to the antenna 130, and FIG. 11E shows a side elevational view of the adapter 600 as coupled to the antenna 130.

As best shown in FIGS. 11A and 11C, each of the two notches 1000 has now been filled with a respective rubber O-ring 617 or 627, with both O-rings 617, 627 being configured the same per this example.

Particularly with respect to FIG. 11B, note that the flange of the plunger 290 may not extend past the outer diameter surface of the adapter 600 (even though the knob of the plunger 290 does so). And note particularly with respect to FIG. 11E that a hexagonal wrench 1100 is shown that may be provided with any or all of the other parts of these figures consistent with present principles.

Figure 12:
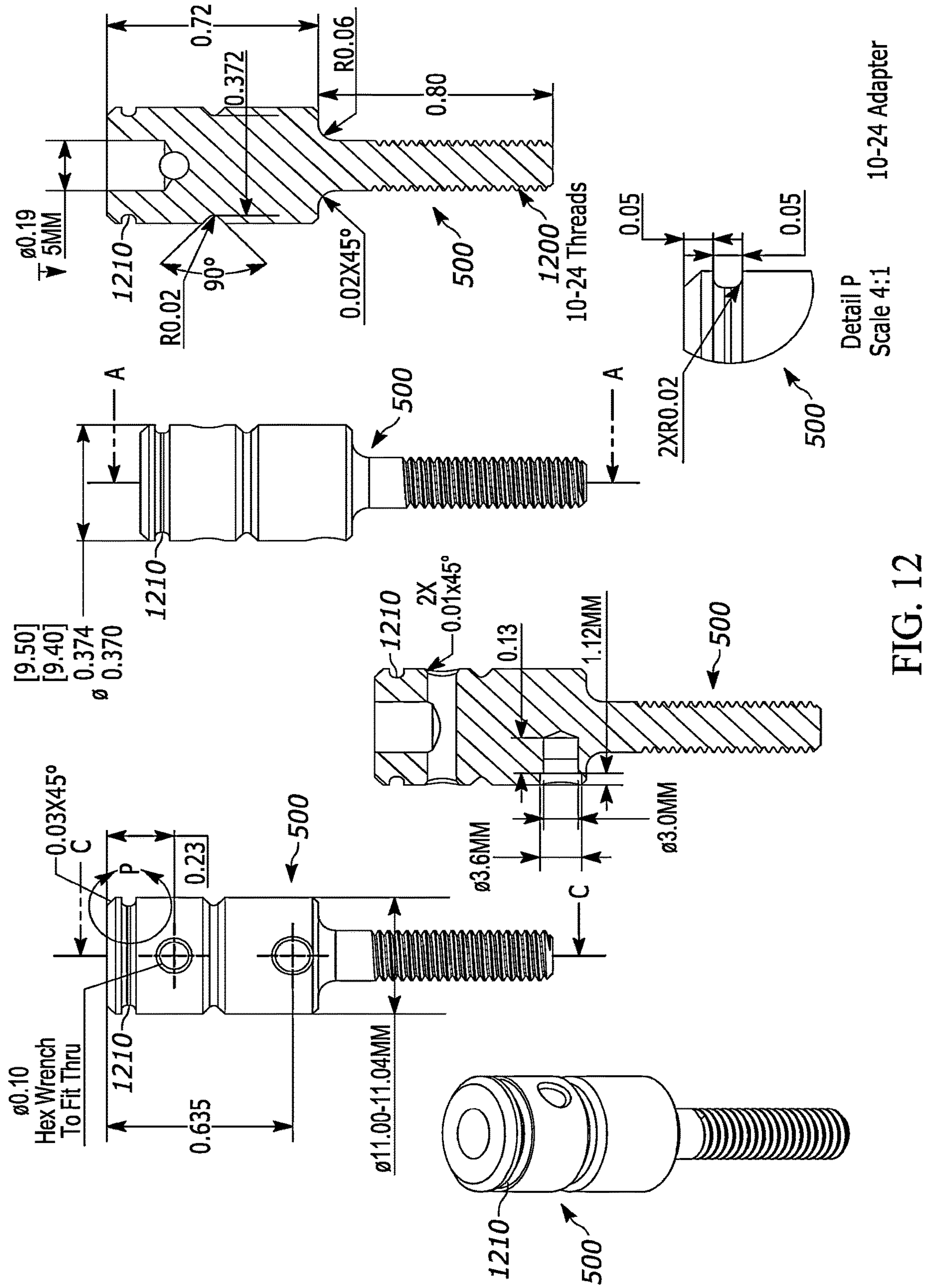
FIGS. 12-15 show specifications for the adapter of FIG. 5 in various views consistent with present principles, with FIGS. 12 and 14 being for one thread configuration and FIGS. 13 and 15 being for another thread configuration.

With respect to FIG. 12, this figure shows specifications for the adapter 500 in various views similar to the views of FIGS. 10A-F, with the adapter 500 having 10-24 integral male threads 1200 according to this example. The adapter 500 may be made of 303 stainless steel with no finish if desired. Note that per this figure, the adapter 500 may have an overall length according to the adapter's longitudinal axis in the range of 1.2 to 1.8 inches, and preferably a length of 1.52 inches in non-limiting example embodiments. Additionally, the overall greatest width/depth of the adapter 500 along the cylindrical upper portion (as a diameter owing to the cylindrical configuration) may be in the range of 11.00 to 11.04 millimeters.

FIG. 12 also shows that a notch 1210 similar to the notches 1000 may be included on the adapter 500 as well. This notch 1200 may therefore be configured to receive the rubber O-ring 520 described above.

Figure 13:
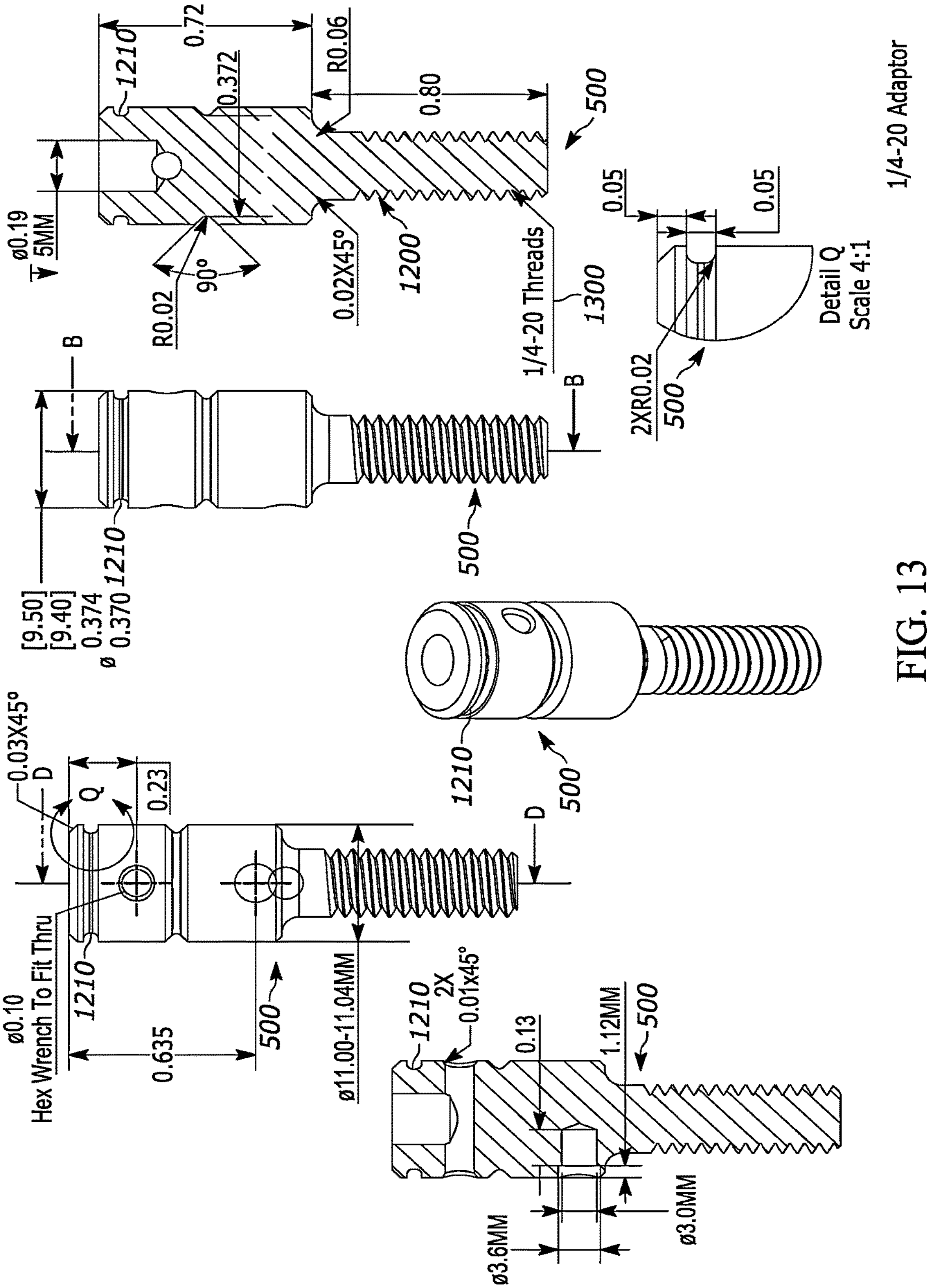

With respect to FIG. 13, this figure shows specifications for the adapter 500 in various views similar to the views of FIGS. 10A-F, with the adapter 500 having ¼-20 integral male threads 1300 according to this example. Again the adapter 500 may be made of 303 stainless steel with no finish if desired. Per this figure, the adapter 500 may still have an overall length according to the adapter's longitudinal axis in the range of 1.2 to 1.8 inches, and preferably a length of 1.52 inches in non-limiting example embodiments. Additionally, the overall greatest width/depth of the adapter 500 along the cylindrical upper portion (as a diameter owing to the cylindrical configuration) may be in the range of 11.00 to 11.04 millimeters. FIG. 13 also still shows the notch 1210 to receive the rubber O-ring 520 described above.

Figure 14:
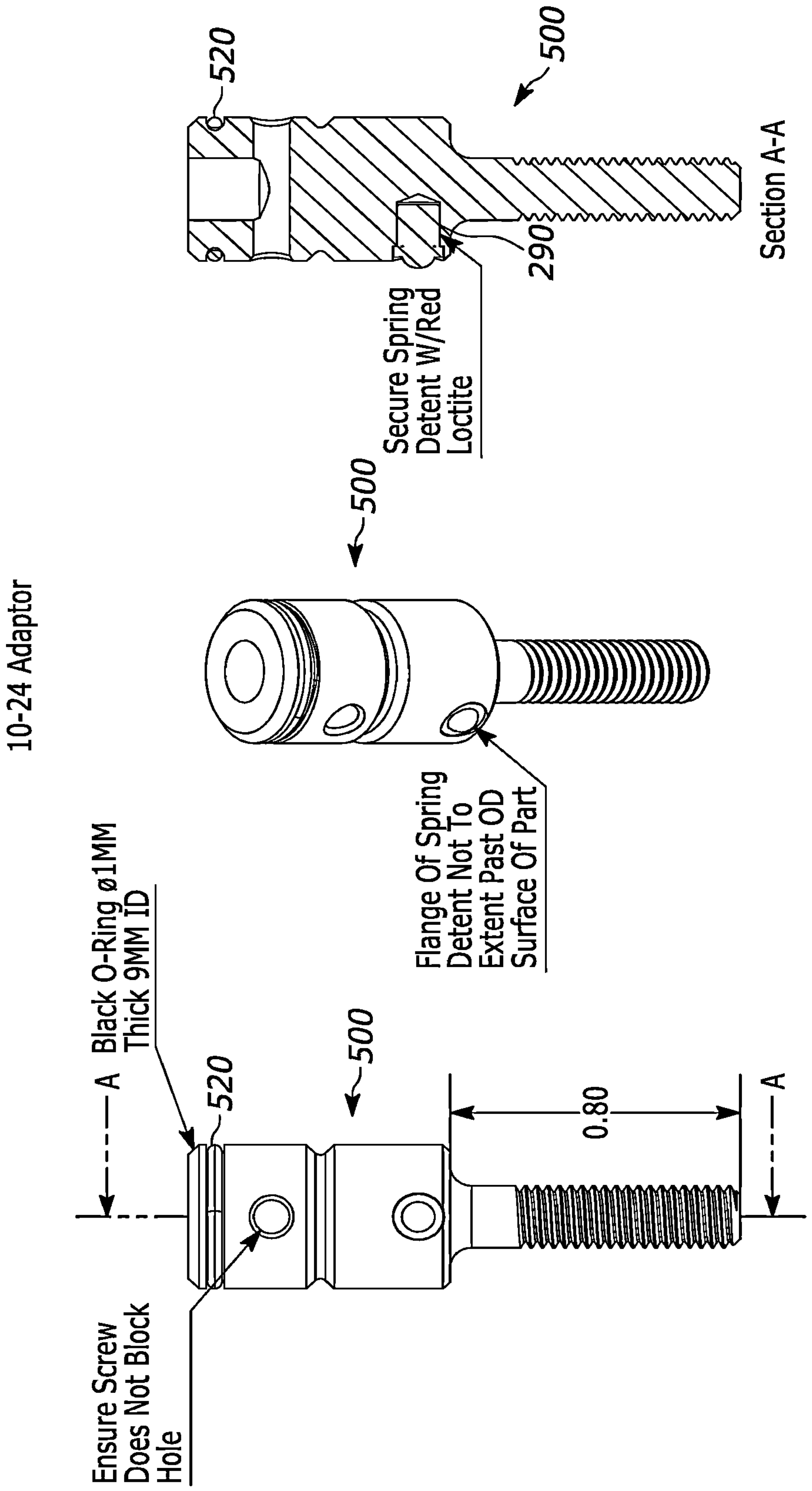

Turning to FIG. 14, this figure shows specifications for the adapter 500 per the 10-24 male threads configuration according to perspective, front side elevational, and side cross-sectional views. Note that the plunger 290/spring detent may be secured within the adapter 500 using red Loctite. Also note that the O-ring 520 is shown as now disposed within the notch 1210.

Figure 15:
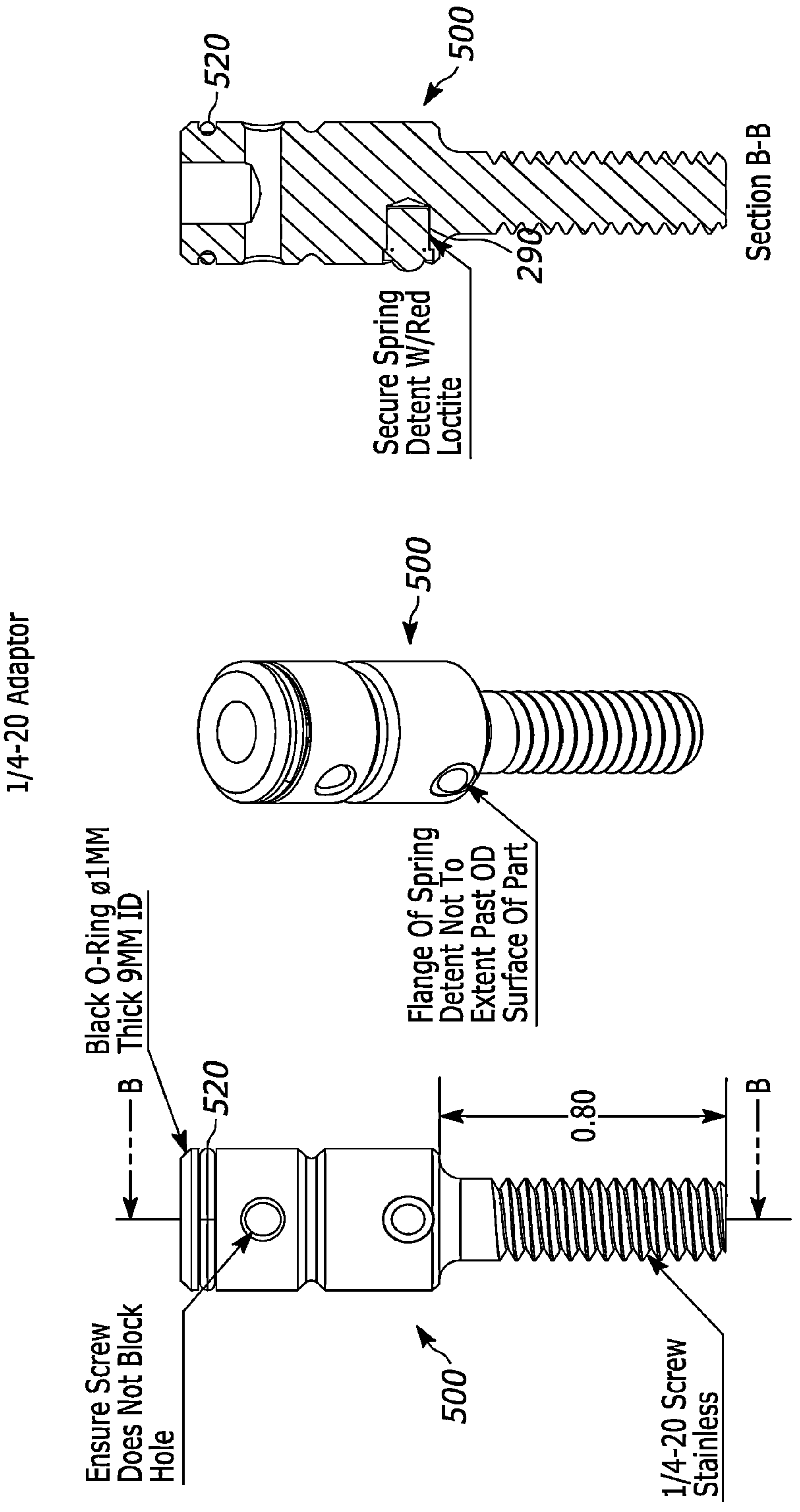

FIG. 15 shows specifications for the adapter 500 per the ¼-20 male threads configuration according to perspective, front side elevational, and side cross-sectional views. Again the plunger 290/spring detent may be secured within the adapter 500 using red Loctite. And again the O-ring 520 is shown as now disposed within the notch 1210.

Figure 16A:
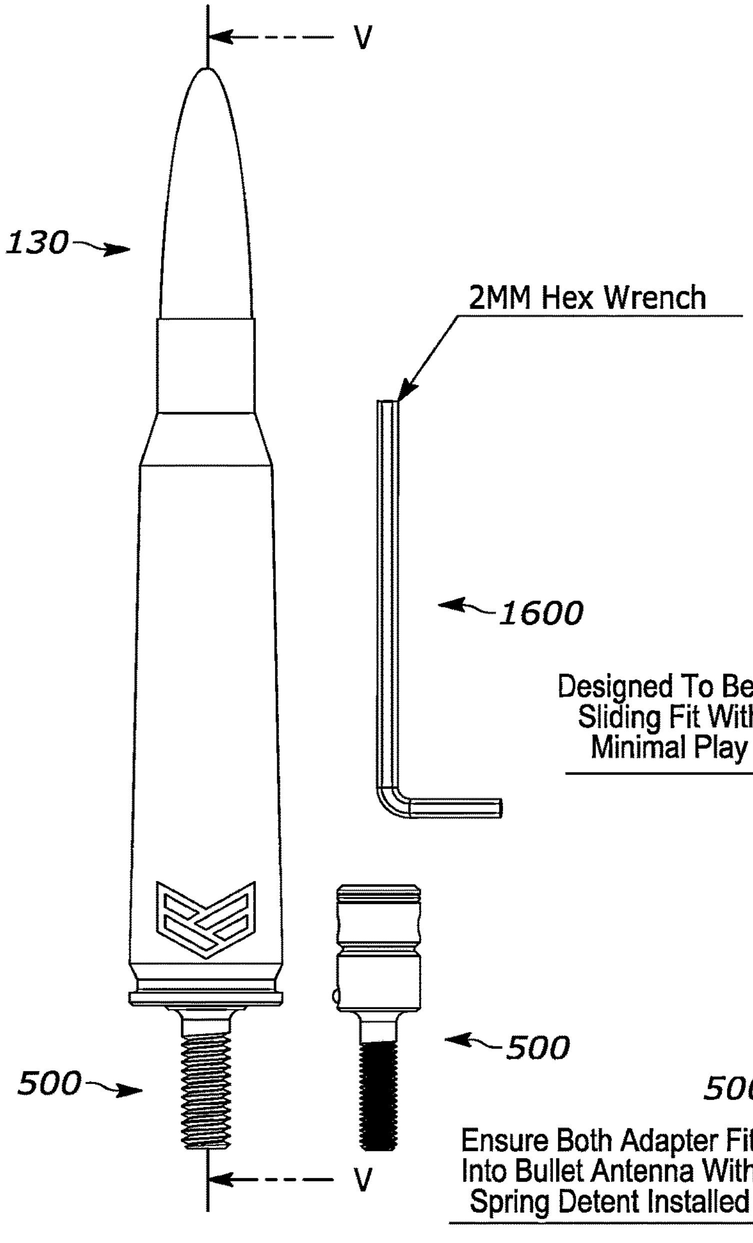
FIGS. 16A and 16B show example specifications for the adapter of FIG. 5 per installation on an antenna consistent with present principles.
Figure 16B:
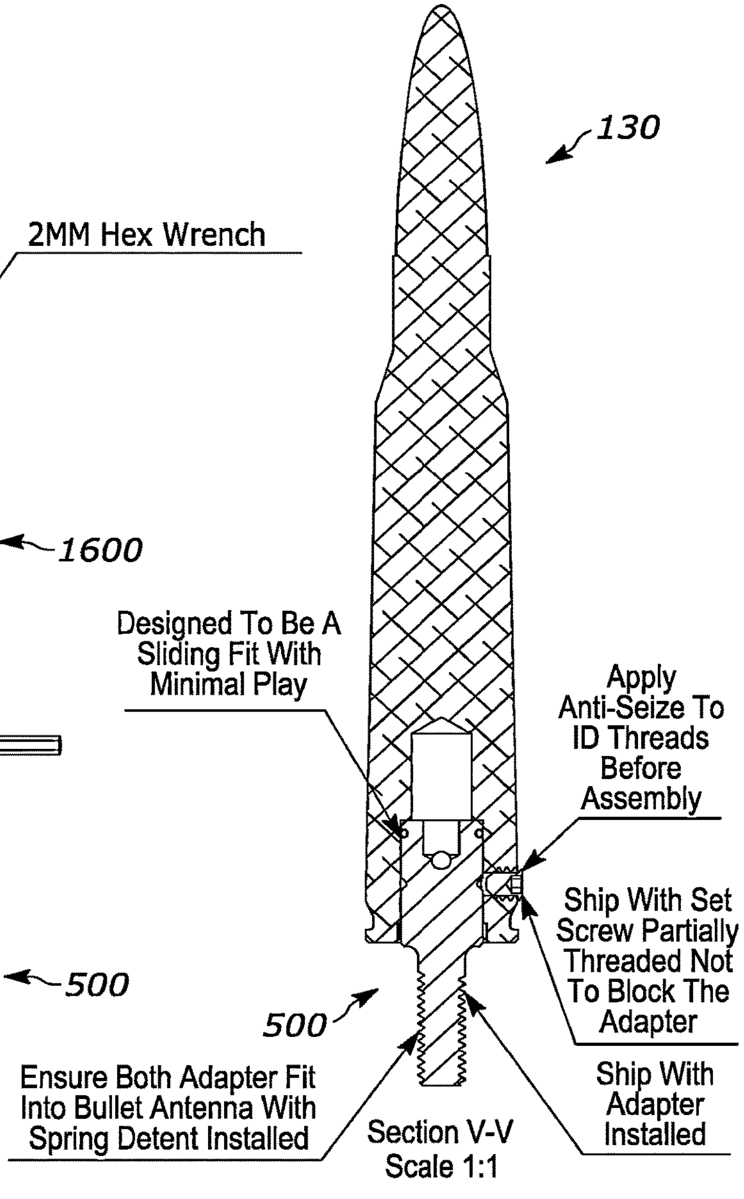

FIG. 16A then shows the adapter 500 as coupled to the antenna 130 in side elevational view, while FIG. 16B shows the adapter 500 as coupled to the antenna 130 in side cross-sectional view. Again a hex wrench 1600 is shown that may be used consistent with present principles and, as such, may be provided with the assembly shown in FIG. 16A.

Figure 17:
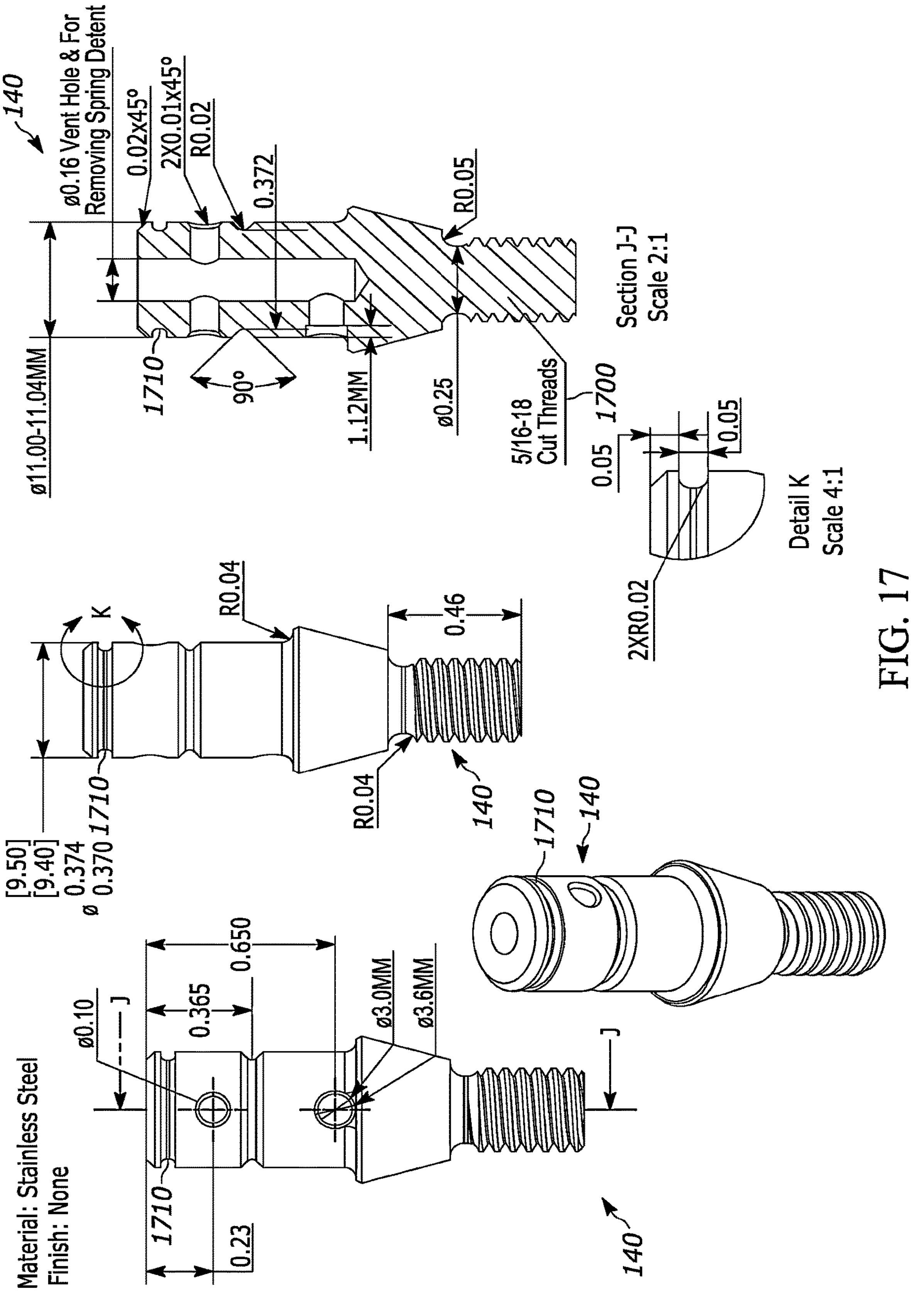
FIG. 17 shows example specifications for the adapter of FIG. 2 in various views consistent with present principles.

With respect to FIG. 17, this figure shows specifications for the adapter 140 in various views similar to the views of FIGS. 10A-F, with the adapter 140 having 5/16-18 cut and integral male threads 1700 according to this example. The adapter 140 may be made of 303 stainless steel with no finish in this example.

Note that per this figure, the adapter 140 may have an overall length according to the adapter's longitudinal axis in the range of 1.2 to 1.8 inches, and preferably a length of 1.51 inches in non-limiting example embodiments. Additionally, the overall greatest width/depth of the adapter 140 along the cylindrical upper portion (as a diameter owing to the cylindrical configuration) may be in the range of 11.00 to 11.04 millimeters.

FIG. 17 also shows that a notch 1710 similar to the notches 1000 may be included on the adapter 140 as well. This notch 1710 may therefore be configured to receive the rubber O-ring 223 described above.

Figure 18:
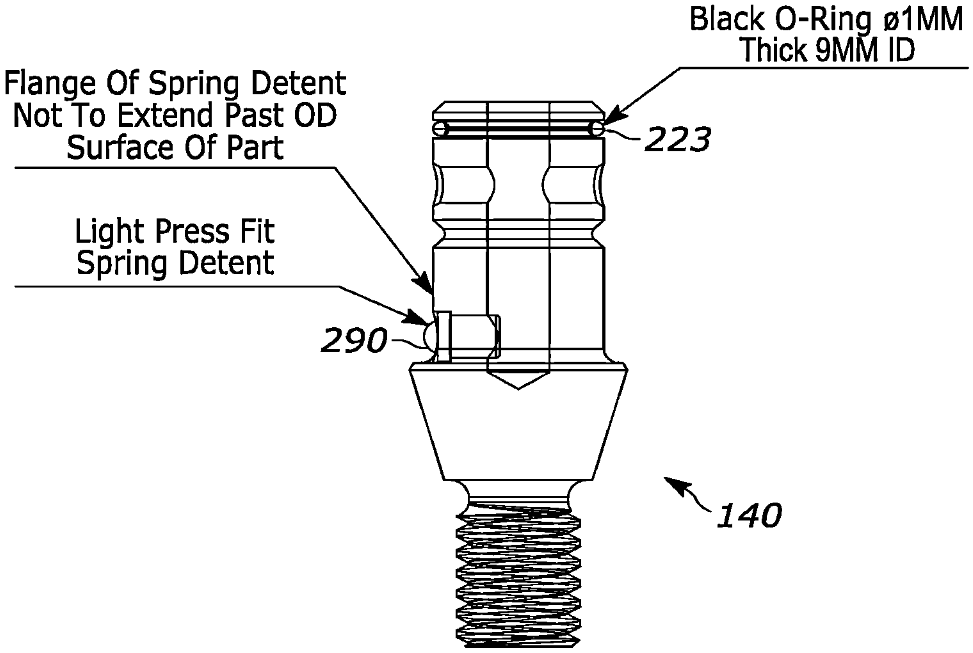
FIG. 18 shows a side elevational view of the adapter of FIG. 2 according to various example specifications.

FIG. 18 shows a side elevational view of the adapter 140 per FIG. 17 and according to various additional example specifications. Here too the adapter 140 may include a black, removable O-ring 223.

Figure 19A:
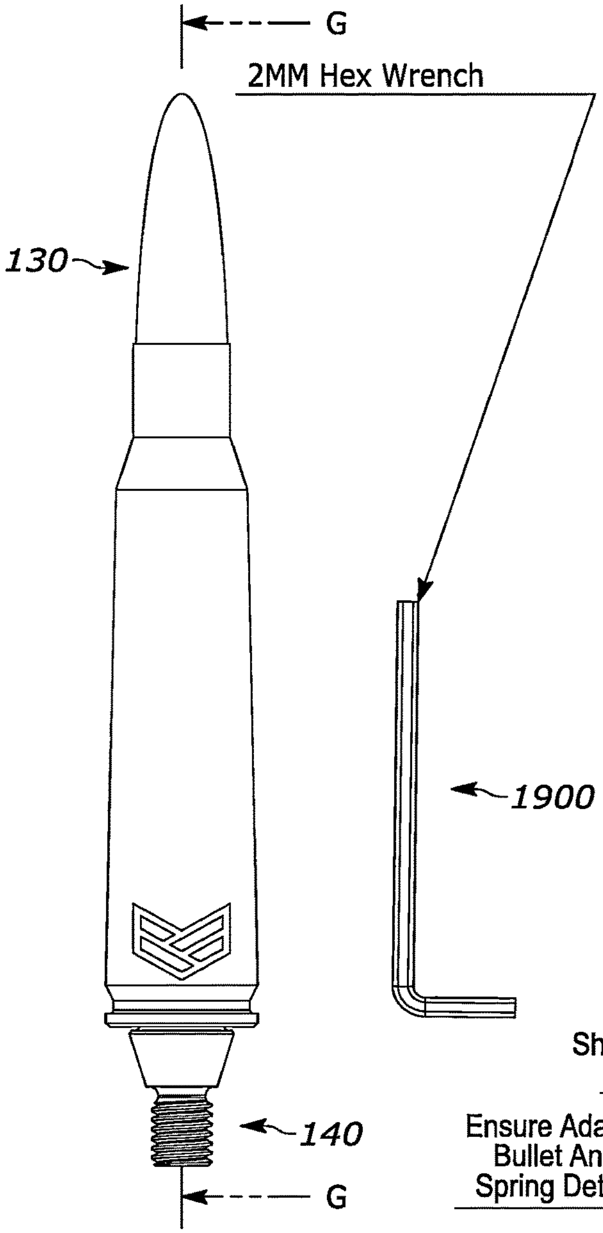
FIGS. 19A and 19B show the adapter of FIG. 2 per installation on an antenna consistent with present principles.
Figure 19B:
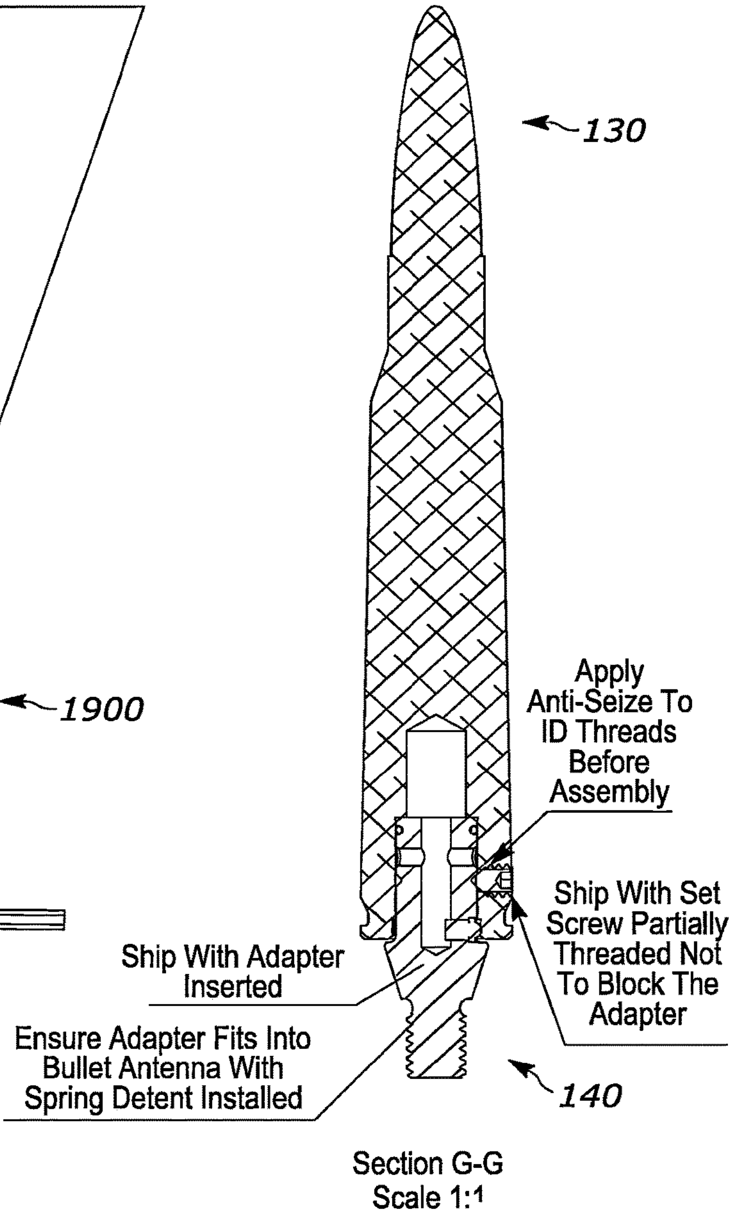

FIG. 19A then shows the adapter 140 as coupled to the antenna 130 in side elevational view, while FIG. 19B shows the adapter 140 as coupled to the antenna 130 in side cross-sectional view. Again a hex wrench 1900 is shown that may be used consistent with present principles and, as such, may be provided with the assembly shown in FIGS. 19A and 19B.

Figure 20:
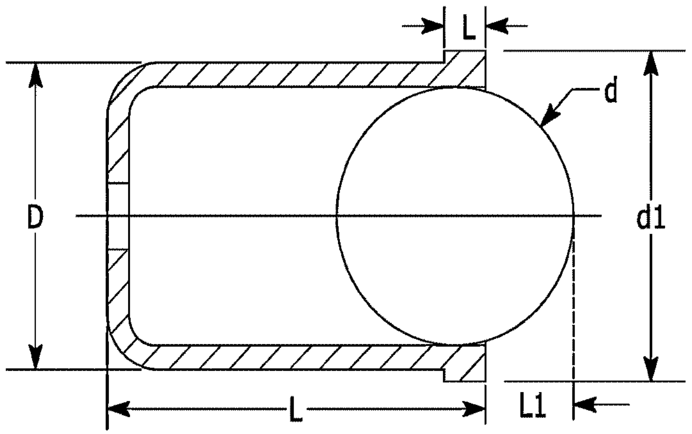
FIG. 20 shows various example specifications for a spring plunger that may be installed on an adapter consistent with present principles.
Figure 20:
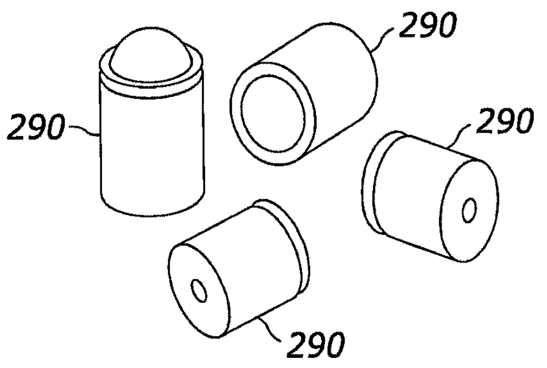

Turning to FIG. 20, this figure shows various example specifications for the plunger 290.

Before concluding, it is to be understood that any combination of elements described above may be provided as a kit to an end-user/consumer or other entity. Thus, an example kit might include an aerodynamic bullet-shaped antenna, one of the antenna adapters described above (including a set screw or other coupling elements), and a hex tool for installation.

Also note that components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

It is to be understood that whilst present principals have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. An apparatus, comprising:

a vehicle antenna adapter configured to receive a vehicle antenna and configured to engage a vehicle antenna mount, the vehicle antenna adapter configured to receive the vehicle antenna at a first end segment of the vehicle antenna adapter and configured to engage the vehicle antenna mount at a second end segment of the vehicle antenna adapter, the second end segment being opposite the first end segment, the vehicle antenna adapter defining a longitudinal axis and comprising an opening extending through the vehicle antenna adapter orthogonally to the longitudinal axis, the vehicle antenna adapter comprising:

a first element configured to assist in removable engagement of the vehicle antenna adapter with the vehicle antenna, the first element comprising a groove into which a fastener is extendable to engage the vehicle antenna adapter with the vehicle antenna; and a second element configured to maintain the vehicle antenna at a particular radial orientation with respect to the vehicle antenna adapter when engaged therewith, the second element comprising a spring plunger configured to at least partially extend into an interior area of the vehicle antenna;

wherein the apparatus further comprises an Allen wrench configured to engage the opening in the vehicle antenna adapter to help screw the vehicle antenna adapter onto the vehicle antenna mount.

2. The apparatus of claim 1, wherein the vehicle antenna adapter is at least partially cylindrical.

3. The apparatus of claim 1, comprising the fastener.

4. The apparatus of claim 1, wherein the fastener comprises a set screw.

5. The apparatus of claim 1, wherein the vehicle antenna adapter comprises a cylindrical section and a frusto-conical section.

6. The apparatus of claim 1, wherein the first end segment is configured to accept a male M6 post, and wherein the second end segment is configured to accept a male M7 post.

7. The apparatus of claim 1, comprising the vehicle antenna.

8. The apparatus of claim 7, wherein the vehicle antenna comprises plural radially-spaced openings each of which is configured to receive a same respective portion of the spring plunger that is extendable into the vehicle antenna to maintain the vehicle antenna at the particular radial orientation with respect to the vehicle antenna adapter.

9. The apparatus of claim 8, wherein the second element, while the vehicle antenna adapter is engaged with the vehicle antenna, inhibits axial rotation of the vehicle antenna with respect to the vehicle antenna adapter.

10. The apparatus of claim 9, wherein the second element, while the vehicle antenna adapter is engaged with the vehicle antenna, still permits axial rotation of the vehicle antenna with respect to the vehicle antenna adapter under force overcoming spring bias of the spring plunger.

11. The apparatus of claim 7, comprising a kit of plural vehicle antenna adapters, the kit comprising a first vehicle antenna adapter for a first vehicle manufacturer, the kit comprising a second vehicle antenna adapter for a second vehicle manufacturer, and the kit comprising a third vehicle antenna adapter for a third vehicle manufacturer, the first, second, and third vehicle manufacturers being different from each other.

12. The apparatus of claim 7, wherein the vehicle antenna is bullet-shaped.

13. The apparatus of claim 12, wherein the vehicle antenna is configured in the size and shape of a fifty caliber ammo round.

14. The apparatus of claim 7, comprising a vehicle on which the vehicle antenna and the vehicle antenna adapter are mounted.

15. A method, comprising:

providing a vehicle antenna adapter configured to receive a vehicle antenna and configured to engage a vehicle antenna mount, the vehicle antenna adapter configured to receive the vehicle antenna at a first end segment of the vehicle antenna adapter and configured to engage the vehicle antenna mount at a second end segment of the vehicle antenna adapter, the second end segment being opposite the first end segment, the vehicle antenna adapter defining a longitudinal axis and comprising an opening extending through the vehicle antenna adapter orthogonally to the longitudinal axis;

providing, as part of the vehicle antenna adapter, a first element configured to assist in removable engagement of the vehicle antenna adapter with the vehicle antenna, the first element comprising a groove into which a set screw is extendable to engage the vehicle antenna adapter with the vehicle antenna;

providing, as part of the vehicle antenna adapter, a second element configured to maintain the vehicle antenna at a particular radial orientation with respect to the vehicle antenna adapter when engaged therewith, the second element comprising a spring plunger configured to at least partially extend into an interior area of the vehicle antenna; and providing, with the vehicle antenna adapter, an Allen wrench configured to engage the opening in the vehicle antenna adapter to help screw the vehicle antenna adapter onto the vehicle antenna mount.

16. The method of claim 15, comprising:

providing the vehicle antenna with the vehicle antenna adapter.

17. The method of claim 15, comprising:

providing a kit of plural vehicle antenna adapters, the kit comprising different vehicle antenna adapters for different vehicle manufacturers, each adapter in the kit configured to accept the vehicle antenna.

18. An apparatus, comprising:

a vehicle antenna adapter configured to receive a vehicle antenna and configured to engage a vehicle antenna mount, the vehicle antenna adapter defining a longitudinal axis and comprising an opening extending through the vehicle antenna adapter orthogonally to the longitudinal axis, the vehicle antenna adapter comprising:

a first element configured to assist in removable engagement of the vehicle antenna adapter with the vehicle antenna, the first element comprising a groove into which a set screw is extendable to engage the vehicle antenna adapter with the vehicle antenna; and a second element configured to maintain the vehicle antenna at a particular radial orientation with respect to the vehicle antenna adapter when engaged therewith, the second element comprising a knob configured to at least partially extend into an interior area of the vehicle antenna;

wherein the apparatus further comprises an Allen wrench configured to engage the opening in the vehicle antenna adapter to help screw the vehicle antenna adapter onto the vehicle antenna mount.

19. The apparatus of claim 18, comprising a kit of vehicle antenna adapters, the kit comprising a first vehicle antenna adapter with two cylindrical portions, the kit comprising a second vehicle antenna adapter with a cylindrical portion and a frusto-conical portion, and the kit comprising a third vehicle antenna adapter with three cylindrical portions.

20. The apparatus of claim 19, comprising:

the vehicle antenna; and the set screw.

* * * * *